(12) United States Patent
Kim et al.

(10) Patent No.: US 10,292,178 B2
(45) Date of Patent: May 14, 2019

(54) METHOD AND APPARATUS FOR REPORTING CHANNEL STATUS IN CELLULAR RADIO COMMUNICATION SYSTEM

(71) Applicant: Samsung Electronics Co., Ltd., Gyeonggi-do (KR)

(72) Inventors: Young-Bum Kim, Seoul (KR); Hyo-Jin Lee, Gyeonggi-do (KR); Seung-Hoon Choi, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 15/115,160

(22) PCT Filed: Jan. 29, 2015

(86) PCT No.: PCT/KR2015/000971
§ 371 (c)(1),
(2) Date: Jul. 28, 2016

(87) PCT Pub. No.: WO2015/115830
PCT Pub. Date: Aug. 6, 2015

(65) Prior Publication Data
US 2016/0345346 A1 Nov. 24, 2016

(30) Foreign Application Priority Data

Jan. 29, 2014 (KR) .................. 10-2014-0011182
Jun. 11, 2014 (KR) .................. 10-2014-0070664

(51) Int. Cl.
*H04W 72/12* (2009.01)
*H04L 5/14* (2006.01)
(Continued)

(52) U.S. Cl.
CPC ......... *H04W 72/1226* (2013.01); *H04L 5/001* (2013.01); *H04L 5/0057* (2013.01);
(Continued)

(58) Field of Classification Search
None
See application file for complete search history.

(56) References Cited

U.S. PATENT DOCUMENTS

2011/0310759 A1\* 12/2011 Gerstenberger ........ H04L 5/001
370/252
2012/0106404 A1 5/2012 Damnjanovic
(Continued)

FOREIGN PATENT DOCUMENTS

CN 103026647 4/2013
CN 103190192 7/2013
(Continued)

OTHER PUBLICATIONS

PCT/ISA/237 Written Opinion issued on PCT/KR2015/000971 (pp. 5).
(Continued)

*Primary Examiner* — Faruk Hamza
*Assistant Examiner* — Cassandra L Decker
(74) *Attorney, Agent, or Firm* — The Farrell Law Firm, P.C.

(57) ABSTRACT

A method and an apparatus for reporting channel status in a cellular radio communication system are disclosed. In a communication system supporting a carrier aggregation of a component carrier to which an FDD scheme is applied and a component carrier to which a TDD scheme is applied, a base station identifies a TDD uplink-downlink configuration of a TDD primary cell, and configures a CSI transmission period of an FDD secondary cell according to the TDD uplink-downlink configuration. A terminal transmits a CSI of the FDD secondary cell in a specific sub-frame of the TDD primary cell according to a CSI configuration period indicated by the base station.

6 Claims, 18 Drawing Sheets

(51) Int. Cl.
*H04L 5/00* (2006.01)
*H04W 88/08* (2009.01)
*H04W 88/02* (2009.01)
*H04W 88/04* (2009.01)
*H04W 84/04* (2009.01)

(52) U.S. Cl.
CPC .............. *H04L 5/14* (2013.01); *H04L 5/1469* (2013.01); *H04W 72/1268* (2013.01); *H04W 84/042* (2013.01); *H04W 88/02* (2013.01); *H04W 88/08* (2013.01)

(56) References Cited

U.S. PATENT DOCUMENTS

| | | | |
|---|---|---|---|
| 2012/0257524 | A1 | 10/2012 | Chen et al. |
| 2013/0039321 | A1* | 2/2013 | Kim .................. H04W 72/0413 370/329 |
| 2013/0121299 | A1 | 5/2013 | Kim et al. |
| 2013/0170406 | A1 | 7/2013 | Kishiyama |
| 2013/0315114 | A1 | 11/2013 | Seo et al. |
| 2014/0092787 | A1* | 4/2014 | Han ........................ H04W 4/70 370/280 |
| 2014/0161002 | A1 | 6/2014 | Gauvreau et al. |
| 2015/0003302 | A1* | 1/2015 | Ekpenyong ........... H04W 72/14 370/280 |
| 2015/0124665 | A1* | 5/2015 | Park .................... H04B 7/0632 370/280 |
| 2016/0014753 | A1* | 1/2016 | Wu ........................ H04B 7/022 370/280 |
| 2016/0164589 | A1 | 6/2016 | Han et al. |
| 2017/0005770 | A1* | 1/2017 | Shimezawa ............... H04L 1/00 |

FOREIGN PATENT DOCUMENTS

| | | |
|---|---|---|
| EP | 2 562 949 | 2/2013 |
| EP | 2 597 799 | 5/2013 |
| WO | WO 2012-109195 | 8/2012 |
| WO | WO 2012/142128 | 10/2012 |
| WO | WO 2012/161914 | 11/2012 |
| WO | WO 2013-043022 | 3/2013 |

OTHER PUBLICATIONS

PCT/ISA/210 Search Report issued on PCT/KR2015/000971 (pp. 3).
Texas Instruments, "Joint TDD-FDD Carrier Aggregation", R1-134274, 3GPP TSG RAN WG1 #74bis, Oct. 7-11, 2013, 4 pages.
Samsung, "CSI Feedback for TDD-FDD CA", R1-140361, 3GPP TSG RAN WG1 Meeting #76, Feb. 10-14, 2014, 5 pages.
European Search Report dated Aug. 29, 2017 issued in counterpart application No. 15743290.7-1875, 8 pages.
Chinese Office Action dated Oct. 16, 2018 issued in counterpart application No. 201580006677.9, 26 pages.
European Search Report dated Oct. 17, 2018 issued in counterpart application No. 15 743 290.7-1219, 6 pages.
Japanese Office Action dated Oct. 22, 2018 issued in counterpart application No. 2016-549042, 8 pages.

* cited by examiner

METHOD AND APPARATUS FOR REPORTING CHANNEL STATUS IN CELLULAR RADIO COMMUNICATION SYSTEM

PRIORITY

This application is a National Phase Entry of PCT International Application No. PCT/KR2015/000971, which was filed on Jan. 29, 2015, and claims priority to Korean Patent Application No. 10-2014-0011182, which was filed on Jan. 29, 2014, and claims priority to Korean Patent Application No. 10-2014-0070664, which was filed on Jun. 11, 2014, the contents of each of which are incorporated herein by reference.

DETAILED DESCRIPTION OF THE INVENTION

Technical Field

The present invention relates to a method and apparatus in which a User Equipment (UE) performs Channel Status Information (CSI) reporting to a Node B in a cellular radio communication system.

Background Art

A mobile communication system has evolved to a high-speed, high-quality wireless packet data communication system in order to provide data services and multimedia services in addition to voice-based services.

Telecommunications Standards Institutes, such as 3rd Generation Partnership Project (3GPP), 3rd Generation Partnership Project 2 (3GPP2), and Institute of Electrical and Electronics Engineers (IEEE), have developed various mobile communication standards, such as High Speed Packet Access (HSPA), Long Term Evolution (LTE), Long Term Evolution Advanced (LTE-A), High Rate Packet Data (HRPD), Ultra Mobile Broadband (UMB), and IEEE 802.16e, to provide high-speed, high-quality packet data services.

In a LTE system which is a representative example of a broadband wireless communication system, Downlink adopts an Orthogonal Frequency Division Multiplexing (OFDM) scheme, and Uplink adopts a Single Carrier Frequency Division Multiple Access (SC-FDMA) scheme. The multiple access scheme allocates and manages resources such that time-frequency resources to carry data or control information for individual users do not overlap, that is, such that orthogonality between users is ensured to thereby separate data or control information according to users.

One of important technologies for providing high-speed radio data services in a broadband wireless communication system is to support a scalable bandwidth. For example, a system transmission band of a LTE system can have various bandwidths, such as 20 MHz, 15 MHZ, 10 MHz, 5 MHz, 3 MHz, and 1.4 MHz, and service providers can select a specific bandwidth from among such various bandwidths to provide a service. Also, there are various kinds of User Equipments (UEs) from UEs supporting a bandwidth of maximally 20 MHz to UEs supporting a bandwidth of minimally 1.4 MHz. Particularly, a LTE-A system can provide a broadband service that covers a bandwidth of maximally 100 MHz through Carrier Aggregation (CA) servicing UEs through a plurality of Component Carriers (CCs).

A LTE and LTE-A system can support both a Frequency Division Duplex (FDD) scheme and a Time Division Duplex (TDD) scheme. The FDD scheme uses separate frequencies for uplink and downlink, whereas the TDD scheme divides transmission and reception of uplink signals and downlink signals in the time domain while using a common frequency for uplink and downlink.

However, a typical mobile communication system supporting CA has limitation that the same duplex scheme should be applied to CCs. That is, only CCs using the FDD scheme or only CCs using the TDD scheme are aggregated. If CCs configured for a UE use different duplex schemes, the UE may perform uplink transmission at different timings according to the CCs. Accordingly, for a CA system in which a cell using an FDD scheme and a cell using a TDD scheme are aggregated and operated, a technology for enabling a UE to effectively report Channel Status Information (CSI) to a node B is needed.

DISCLOSURE

Technical Problem

The present disclosure provides a method and apparatus in which a User Equipment (UE) reports Channel Status Information (CSI) to enable a Node B to efficiently transmit downlink data in a radio communication system.

The present disclosure provides a method and apparatus in which a UE efficiently reports CSI in a communication system supporting Carrier Aggregation (CA).

The present disclosure provides a method and apparatus in which a UE reports CSI to a node B in a communication system supporting CA of Component Carriers (CCs) of different duplex modes.

The present disclosure provides a method and apparatus in which a node B decides a CSI transmission period for a secondary cell of a UE when CA has been configured between cells of different duplex modes.

The present disclosure provides a method and apparatus in which a UE periodically transmits CSI of a secondary cell through a primary cell when CA has been configured between cells of different duplex modes.

Technical Solution

In accordance with an aspect of exemplary embodiments of the present invention, there is provided a method of receiving channel status information (CSI) in a cellular radio communication system including: configuring carrier aggregation (CA) between a primary cell of a first duplex mode and a secondary cell of a second duplex mode with respect to a user equipment (UE), and deciding a CSI transmission period of the secondary cell based on a first group of CSI transmission periods defined for the first duplex mode; and transmitting information about the decided CSI transmission period to the UE.

In accordance with another aspect of exemplary embodiments of the present invention, there is provided a method in which a user equipment (UE) reports channel state information (CSI) in a cellular radio communication system including: receiving configuration information for configuring carrier aggregation (CA) between a primary cell of a first duplex mode and a secondary cell of a second duplex mode, from a Node B; receiving information representing a CSI transmission period for periodic CSI reporting of the secondary cell, from the node B; and reporting CSI of the secondary cell to the node B according to the CSI transmission period, wherein the CSI transmission period of the secondary cell is decided based on a first group of CSI transmission periods decided for the first duplex mode.

In accordance with another aspect of exemplary embodiments of the present invention, there is provided a node B of controlling channel status information (CSI) reporting in a cellular radio communication system including: a controller adapted to configure carrier aggregation (CA) between a primary cell of a first duplex mode and a secondary cell of a second duplex mode with respect to a user equipment (UE), and to decide a CSI transmission period of the secondary cell based on a first group of CSI transmission periods defined for the first duplex mode; and a transmitter adapted to transmit information about the decided CSI transmission period to the UE.

In accordance with another aspect of exemplary embodiments of the present invention, there is provided a user equipment (UE) of reporting channel status information (CSI) in a cellular radio communication system including: a receiver adapted to receive configuration information for configuring carrier aggregation (CA) between a primary cell of a first duplex mode and a secondary cell of a second duplex mode, from a node B, and to receive information representing a CSI transmission period for periodic CSI reporting of the secondary cell from the node B; and a transmitter adapted to report CSI of the secondary cell to the node B according to the CSI transmission period, wherein the CSI transmission period of the secondary cell is decided based on a first group of CSI transmission periods decided for the first duplex mode.

BEST MODE

Hereinafter, embodiments of the present disclosure will be described in detail with reference to the accompanying drawings. In the following description, if it is determined that detailed descriptions for related, well-known functions or configurations make the subject matter of the present disclosure obscure unnecessarily, the detailed descriptions will be omitted. Also, although terms used in the present disclosure were selected as terminology used in the present disclosure while considering the functions of the present disclosure, they may vary according to a user's or operator's intentions, judicial precedents, and the like. Hence, the terms must be defined based on the contents of the entire specification, not by simply stating the terms themselves.

The embodiments of the present invention will be described by employing Evolved Universal Mobile Telecommunications System Terrestrial Radio Access (E-UTRA) (or, called "LTE") or Advanced E-UTRA (or, called "LTE-A"). However, the present disclosure is not limited to such specific systems, and the embodiments of the present invention can also be applied to various communication systems having similar technical background and/or channel type. Furthermore, the embodiments of the present invention can also be applied to other communication systems through partial modification by the determination of those who skilled in the art without departing from the scope of the present invention.

In this specification, a Node B (NB), which is an entity to allocate resources to User Equipments (UEs), may be a eNode B (eNB), a Base Station (BS), a wireless access unit, a base station controller, or a node on a network. Also, a UE may be a Mobile Station (MS), a cellular phone, a smart phone, a computer, or a multimedia system that can perform a communication function.

Figure 1:
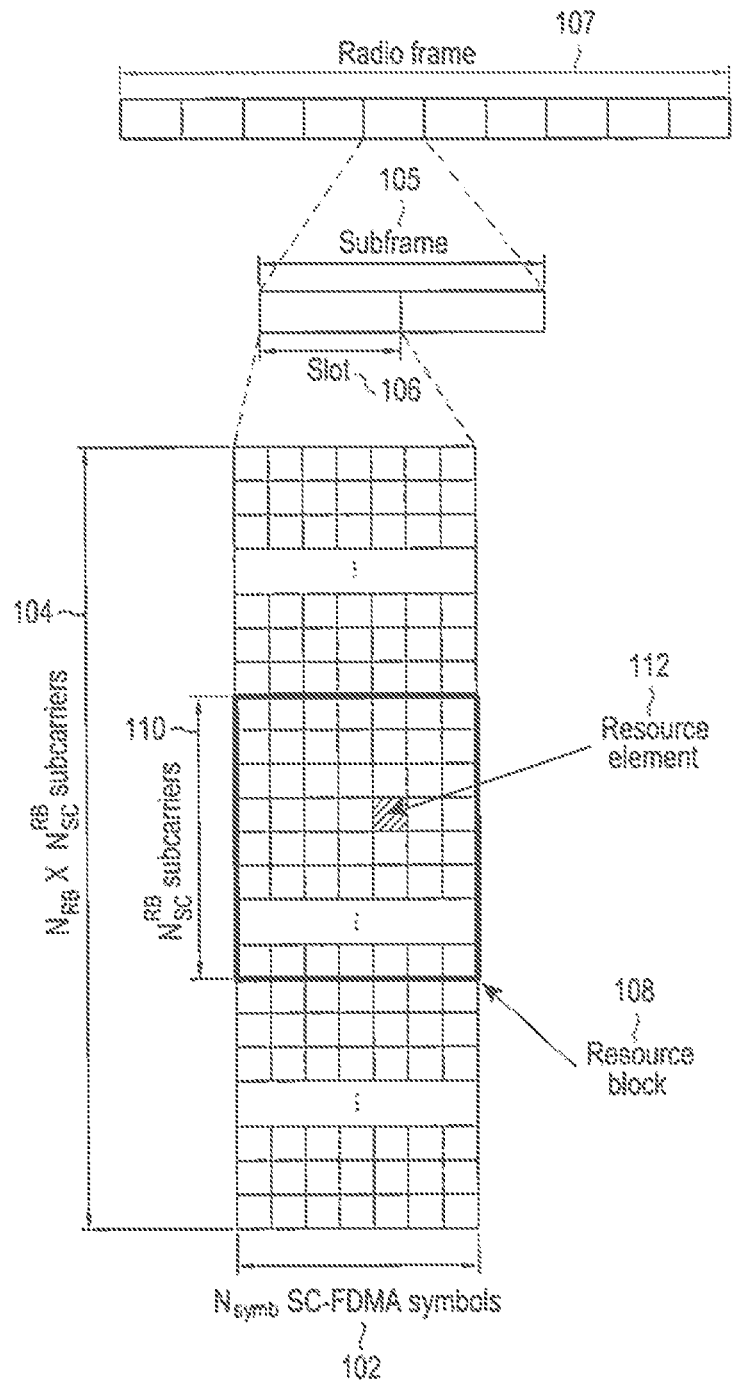
FIG. 1 shows a basic structure of an uplink time-frequency resource area in a Long Term Evolution (LTE) system.

FIG. 1 shows a basic structure of an uplink time-frequency resource area in a Long Term Evolution (LTE) system. An uplink (UL) means a radio link through which a UE can transmit data or control signals to a NB, and a downlink (DL) means a radio link through which a NB can transmit data or control signals to a UE.

Referring to FIG. 1, in a 2Dimensional (2D) radio resource area, the horizontal axis represents a time domain, and the vertical axis represents a frequency domain. In the time domain, a minimum transmission unit may be a Single Carrier Frequency Division Multiple Access (SC-FDMA) symbol, a $N_{symb}$ number 102 of SC-FDMA symbols may be grouped to configure a slot 106, two slots may be grouped to configure a subframe 105, and 10 subframes may be grouped to configure a radio frame 107. The length of the slot 106 may be 0.5 ms, the length of the subframe 105 may be 1.0 ms, and the length of the radio frame 107 may be 10 ms. In the frequency domain, a minimum transmission unit is a subcarrier.

In the time-frequency domain, a basic unit of a resource may be a Resource Element (RE) 112, and each RE 112 may be defined by a SC-FDMA symbol index and a subcarrier index. A resource block (RB) (also, referred to as a Physical Resource Block (PRB)) 108 may be defined by a $N_{symb}$ number of successive SC-FDMA symbols 102 in the time domain and a $N^{RB}_{SC}$ number of successive subcarriers 110 in the frequency domain. Accordingly, a RB 108 may be configured with a $N_{symb} \times N^{RB}_{SC}$ number of REs 112. Generally, a minimum transmission unit of data may be a RB, and a system transmission band may be configured with a total $N^{RB}$ number of RBs. Also, a total system transmission band may be configured with a total $N^{RB} \times N^{RB}_{SC}$ number of subcarriers 104. In a LTE system, generally, $N_{symb}=7$ and $N^{RB}_{SC}=12$. However, in some cases, $N_{symb}$ and $N^{RB}_{SC}$ may be set to other values.

The LTE system may use schemes, such as an Adaptive Modulation and Coding (AMC) scheme and a Channel Sensitive Scheduling (CSS) scheme, in order to improve transmission efficiency. When the AMC scheme is used, a transmitter can adjust an amount of data to transmit according to a channel status. That is, if a channel status is poor, the transmitter may decrease an amount of data to transmit to adjust probability of reception errors to a desired level. Also, if a channel status is good, the transmitter may increase an amount of data to transmit to adjust probability of reception errors to a desired level, while effectively transmitting a large amount of information. When a CSS-based resource management scheme is used, the transmitter may provide a service selectively to a user having an excellent channel status from among many users so as to be able to increase radio system capacity of a mobile communication system, compared to a method of allocating a channel and providing a service to each user. Such an increase in capacity is called a Multi-user Diversity (MuD) gain. In summary, the AMC scheme and the CSS scheme are to receive a feedback about partial Channel Status Information (CSI) from a receiver, and to apply an appropriate modulation and coding scheme at a time determined to be a most efficient time.

If the AMC scheme is used together with a Multiple Input Multiple Output (MIMO) scheme, a function of deciding the number (or rank) of spatial layers to transmit signals, precoding, etc. can be provided. In this case, the AMC scheme may use MIMO to decide what number of transmission layers are to be used, instead of considering only a coding rate and a modulation method, in order to decide an optimal data rate.

In order to support the AMC scheme, a UE may need to perform operation of reporting CSI to a NB. The CSI may include at least one of a Channel Quality Indicator (CQI), a Precoding Matrix Indicator (PMI), and a Rank Indicator (RI). The CQI may represent a Signal to Interference and Noise Ratio (SINR) for the wideband or subband of a system. The CQI may be expressed in the form of a Modulation and Coding Scheme (MCS) for satisfying generally required data reception performance. The PMI may provide precoding information required for a NB to transmit data through multiple antennas in a system supporting MIMO. The RI may provide rank information required for a NB to transmit data through multiple antennas in a system supporting MIMO. The CSI may be information which a UE provides to a NB in order to help determination on scheduling of the NB. The NB may determine information, such as a MCS, precoding, a rank, and the like, which is applied for actual data transmission, based on the CSI.

The UE may periodically transmit CSI at regular time intervals according to a pre-appointment with the NB. This is called "periodic CSI reporting". The NB may inform the UE of control information (for example, a CSI transmission period, a CSI transmission resource, etc.) required for the "periodic CSI reporting" of the UE, through signaling. For the "periodic CSI reporting", the UE may transmit CSI to the NB, basically, through a Physical Uplink Control Channel (PUCCH). However, there may be an exception that the UE needs to perform transmission through a Physical Uplink Shared Channel (PUSCH) which is a channel for uplink data transmission, at the time when CSI has to be transmitted for "Periodic CSI reporting". In this case, the UE may multiplex CSI with uplink data to transmit to the NB through the PUSCH.

Differently from "periodic CSI reporting", the NB may request the UE to perform "aperiodic CSI reporting", as necessary. The NB may transmit "control information requesting aperiodic CSI reporting" to the UE through a control channel for scheduling uplink data of the UE. The UE may receive a request for "aperiodic CSI reporting" through the "control information requesting aperiodic CSI reporting", and may report CSI to the NB through the PUSCH.

The LTE system adopts a Hybrid Automatic Repeat reQuest (HARQ) scheme of re-transmitting, when a decoding failure occurred at a UE or a NB upon data transmission, the corresponding data in a physical layer. In the HARQ scheme, when a receiver fails to accurately decode data, the receiver may transmit HARQ NECK (Negative Acknowledgement) which is information of informing a decoding failure to a transmitter so that the transmitter can re-transmit the corresponding data in the physical layer. Then, the receiver may combine data re-transmitted from the transmitter with the data subject to the decoding failure to increase data reception performance. Meanwhile, if the receiver has accurately decoded data, the receiver may transmit HARQ ACK (Acknowledgement) which is information of informing a decoding success to the transmitter so that the transmitter can transmit new data.

Control information, such as HARQ ACK/NACK and CSI, which is fed back from the UE to the NB, is called Uplink Control Information (UCI). In the LTE system, the UCI may be transmitted to the NB through the PUCCH which is an uplink control channel dedicated to control information, or the UCI may be multiplexed with uplink data and then transmitted to the NB through the PUSCH which is a physical channel for uplink data transmission.

One of important factors for providing a high-speed radio data service in a broadband radio communication system is to support a scalable bandwidth. For example, a system transmission band of a LTE system has various bandwidths of 20 MHz, 15 MHz, 10 MHz, 5 MHz, 3 MHz, 1.4 MHz, etc., and service providers select a desired bandwidth from the various bandwidths to provide a service. Also, a UE supports a bandwidth of maximally 20 MHz or a bandwidth of 1.4 MHz, according to its kind.

A LTE-A system requires a wider bandwidth than the LTE system for high-speed data transmission. Also, the LTE-A system needs to provide backward compatibility with LTE UEs, and the LTE UEs should be able to access the LTE-A system to receive a service from the LTE-A system. For this, the LTE-A system divides an entire system band into component carriers (CCs) or subbands of a bandwidth that a LTE UE can transmit or receive, and combines several CCs to provide a service to each LTE UE. The LTE-A system transmits data for each CC, and performs a transmission/reception process of the typical LTE system for each CC to thereby support high-speed data transmission. As such, the LTE-A system uses a CA scheme of aggregating LTE carriers to provide a broadband service through a bandwidth of maximally 100 MHz.

Figure 2:
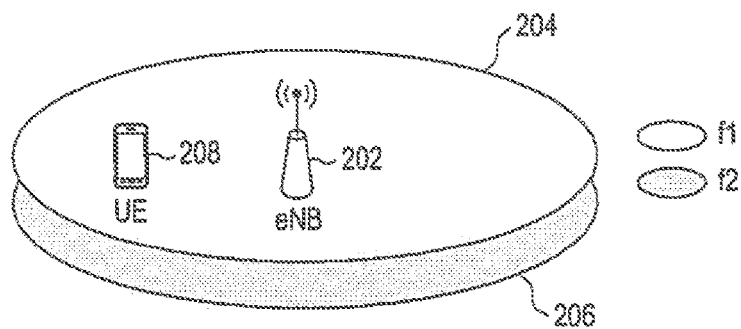
FIG. 2 shows an example of a system configuration of a LTE-Advanced (LTE-A) system supporting Carrier Aggregation (CA)

FIG. 2 shows an example of a system configuration of a LTE-A system supporting CA.

Referring to FIG. 2, a NB 202 may support aggregation of two CCs, that is, CC#1 and CC#2, wherein CC#1 may be configured with a frequency f1, and CC#2 may be configured with a frequency f2 that is different from the frequency f1. The CC#1 and CC#2 may be included in the NB 202. The NB 202 may provide coverages 204 and 206 corresponding to the respective CC#1 and CC#2. In the LTE-A system supporting CA, data transmission and control information transmission for supporting data transmission may be performed for each corresponding CC. In the present specification, the term "cell" is used as the same meaning as a CC, unless it clearly dictates otherwise. The system configuration shown in FIG. 2 can be applied to uplink CCs, as well as to downlink CCs.

In a CA system, each CC may be classified into a primary cell Pcell or a secondary cell Scell. The Pcell may provide a basic radio resource to a UE, and means a basic cell in which a UE performs operation, such as initial access and handover. The Pcell may be configured with a downlink primary frequency (or, referred to as a Primary Component Carrier (PCC)) and an uplink primary frequency. The UE may transmit UCI including HARQ ACK/NACK or CSI, which is fed back to the NB, through PUCCH, wherein the PUCCH can be transmitted only through the Pcell. Meanwhile, the Scell may provide an additional radio resource to a UE, and may be configured with a downlink secondary frequency (or, referred to as a Secondary Component Carrier (SCC)) and an uplink secondary frequency, or only with a downlink secondary frequency.

The LTE and LTE-A system can support an Frequency Division Duplex (FDD) scheme and a Time Division Duplex (TDD) scheme for each cell. The FDD scheme uses different frequencies for an uplink and a downlink, whereas the TDD scheme uses a common frequency for both an uplink and a downlink, but divides transmission and reception of uplink signals and downlink signals in the time domain. The LTE and LTE-A system distinguishes and transmits an uplink or downlink signal for each subframe based on the TDD scheme. Accordingly, the LTE and LTE-A system may equally allocate subframes for an uplink/downlink in the time domain, allocate more subframes to the downlink, or allocate more subframes to the uplink, according to the traffic loads of the uplink and downlink.

The following Table 1 shows TDD uplink-downlink (UL-DL) configurations defined in the LTE standard.

TABLE 1

| Uplink-downlink configuration | Subframe number | | | | | | | | | |
|---|---|---|---|---|---|---|---|---|---|---|
| | 0 | 1 | 2 | 3 | 4 | 5 | 6 | 7 | 8 | 9 |
| 0 | D | S | U | U | U | D | S | U | U | U |
| 1 | D | S | U | U | D | D | S | U | U | D |
| 2 | D | S | U | D | D | D | S | U | D | D |
| 3 | D | S | U | U | U | D | D | D | D | D |
| 4 | D | S | U | U | D | D | D | D | D | D |
| 5 | D | S | U | D | D | D | D | D | D | D |
| 6 | D | S | U | U | U | D | S | U | U | D |

As shown in Table 1, each of 10 subframes configuring a radio frame may operate as one of "D", "U", and "S" according to an uplink-downlink configuration defined by a NB. Herein, "D" represents a subframe set for downlink transmission, "U" represents a subframe set for uplink transmission, and "S" represents a special subframe configured with a Downlink Pilot Time Slot (DwPTS), a Guard Period (GP), and an Uplink Pilot Time Slot (UpPTS). In the DwPTS, downlink control information can be transmitted, like in a general downlink subframe, and if the length of the DwPTS is sufficiently long according to the configuration of the special subframe, downlink data can also be transmitted. The GP may be used to enable transition from a downlink to an uplink, and the length of the GP may be decided according to a network setting and the like. The UpPTS may be configured with one or two SC-FDMA symbols, and the UpPTS may be used to transmit a Sounding Reference Signal (SRS) of a UE required for a NB to estimate an uplink channel status, or to transmit a random-access preamble of a UE for random access.

Figure 3:
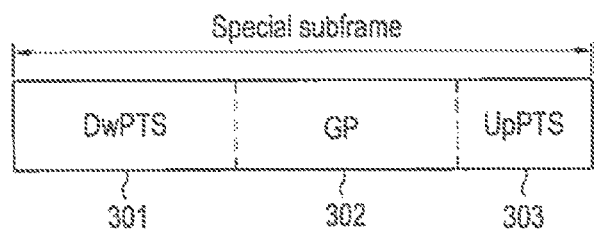
FIG. 3 shows a structure of a special subframe of a Long Term Evolution Time Division Duplex (LTE TDD) system.

FIG. 3 shows a structure of a special subframe of a Long Term Evolution Time Division Duplex (LTE TDD) system.

Referring to FIG. 3, the special subframe may have a length of 1 ms, like a general subframe. According to a special subframe configuration given by a NB, DwPTS 301 may be configured with 3 to 12 OFDM symbols, UpPTS 303 may be configured with 1 or 2 SC-FDMA symbols, and GP 302 may be configured with the remaining time period resulting from subtracting the length of the DwPTS 301 and the UpPTS 303 from 1 ms. The special subframe may be set to a location of Subframe#1 or Subframe#6 according to the TDD uplink-downlink configuration as shown in Table 1.

For example, in the case of TDD uplink-downlink configuration#6, Subframe#0, Subframe#5, and Subframe#9 can transmit downlink data and control information, and Subframe#2, Subframe#3, Subframe#4, Subframe#7, and Subframe#8 can transmit uplink data and control information. Also, Subframe#1 and Subframe#6 corresponding to special subframes may transmit downlink control information, and downlink data in some cases, and may transmit a SRS or a random-access preamble to an uplink.

The TDD uplink-downlink configuration as described above may be applied to each CC, that is, to each cell. However, if CCs (that is, CA cells) to which CA is applied use different duplex schemes, a UE may perform uplink transmission at different locations of subframes according to the cells.

Figure 4:
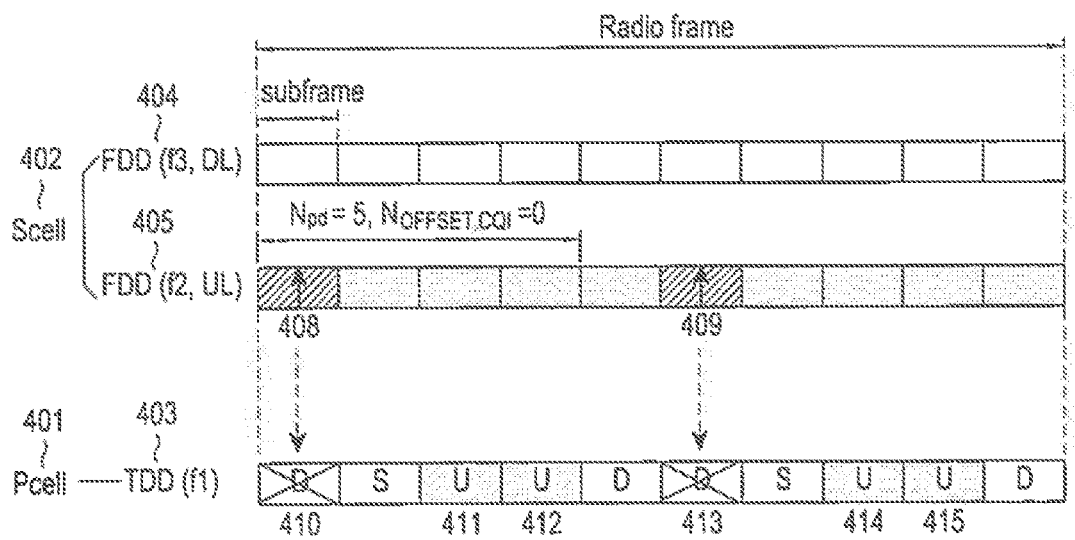
FIG. 4 is a view for describing timing for an uplink report when cells to which CA is applied use different duplex schemes.

FIG. 4 is a view for describing an example of timing for an uplink report when cells to which CA is applied use different duplex schemes.

Referring to FIG. 4, Pcell 401 and Scell 402 may be configured for CA of a UE, wherein the Pcell 401 operates in a TDD mode, and the Scell 402 operates in an FDD mode. The Pcell 401 may be configured with a frequency f1 403 operating in the TDD mode, and the Scell 402 may be configured with an uplink frequency f2 405 and a downlink frequency f3 404 to operate in the FDD mode. The Pcell 401 may operate according to TDD uplink-downlink configuration#4 among the TDD uplink-downlink configurations shown in Table 1.

If CA is applied to the LTE-A system, a report period of "periodic CSI reporting" can be independently set for each cell.

In the LTE and LTE-A system, a CSI transmission period $N_{pd}$ for "periodic CSI reporting" of an FDD cell may be set to one of {2, 5, 10, 20, 40, 80, 160, 32, 64, 128}, and a CSI transmission period $N_{pd}$ for "periodic CSI reporting" of a TDD cell may be set to one of {1, 5, 10, 20, 40, 80, 160}. A unit of a CSI transmission period may be a subframe. A NB may inform a UE of a CSI transmission period $N_{pd}$ and a subframe offset $N_{OFFSET,CQI}$ representing locations of subframes allowing "periodic CSI reporting" in a radio frame, for "periodic CSI reporting".

In the example of FIG. 4, CSI transmission period $N_{pd}$=5, and subframe offset $N_{OFFSET,CQI}$=0. "Periodic CSI reporting" of a UE can be performed by a subframe satisfying Equation 1 below.

$$(10 \times n_f + \lfloor n_s/2 \rfloor - N_{OFFSET,CQI}) \bmod (N_{pd}) = 0, \quad (1)$$

where $n_f$ represents a radio frame number, and $n_s$ represents a slot number in the radio frame. Since a subframe is configured with 2 slots, a radio frame may be configured with 20 slots. In the example of FIG. 4, if $n_f$=1, a first subframe ($n_s$=0 or 1) 408 of the uplink frequency 405 of the Scell 402 may satisfy Equation 1, as follows.

$$(10 \times 1 + 0 - 0) \bmod 5 = 0$$

Accordingly, the first subframe 408 may be a subframe allowing "periodic CSI reporting". Likewise, since the fifth subframe ($n_s$=10 or 11) 409 also satisfies Equation 1 (($10 \times 1+5-0$) mod 5=0), the fifth subframe 409 may also be a subframe allowing "periodic CSI reporting".

As described above, UCI can be transmitted only through the Pcell 401. However, since the subframes 410 and 413 of the Pcell 401 corresponding to the first and fifth subframes 408 and 409 of the Scell 402 are downlink subframes, the UE cannot perform "periodic CSI reporting" to the NB through the Pcell 401 in the subframes 410 and 413. That is, in the example of FIG. 4, the UE cannot perform "periodic CSI reporting" for the Scell 402, at CSI transmission period $N_{pd}$=5 and subframe offset $N_{OFFSET,CQI}$=0.

In the example of FIG. 4, the UE can perform "periodic CSI reporting" only in the uplink subframes 411, 412, 414, and 415 of the Pcell 401.

Hereinafter, in a CA system in which a cell using the FDD scheme and a cell using the TDD scheme are aggregated and operated, as described above, embodiments in which a UE performs "periodic CSI reporting" to a NB will be described.

First Embodiment

In a CA system in which a cell (also, referred to as an FDD cell) using the FDD scheme and a cell (also, referred to as a TDD cell) using the TDD scheme are aggregated and operated, when the TDD cell is configured with a frequency f1 to operate as a Pcell (hereinafter, the TDD cell is referred to as a TDD Pcell), and the FDD cell is configured with an uplink frequency f2 and a downlink frequency f3 to operate as a Scell (hereinafter, the FDD cell is referred to as an FDD Scell), operation for performing "periodic CSI reporting" for the FDD Scell through the TDD Pcell will be described in detail.

In the first embodiment, a CSI transmission period $N_{pd}$ that can be set for the FDD Scell may be limited according to TDD uplink-downlink configurations of the TDD Pcell. That is, according to TDD uplink-downlink configurations of the TDD Pcell, a CSI transmission period that can be applied to the FDD Scell may be selected from {2, 5, 10, 20, 40, 80, 160, 32, 64, 128} that are CSI transmission periods $N_{pd}$ that can be set for an FDD cell in the LTE and LTE-A system.

Figure 5A:
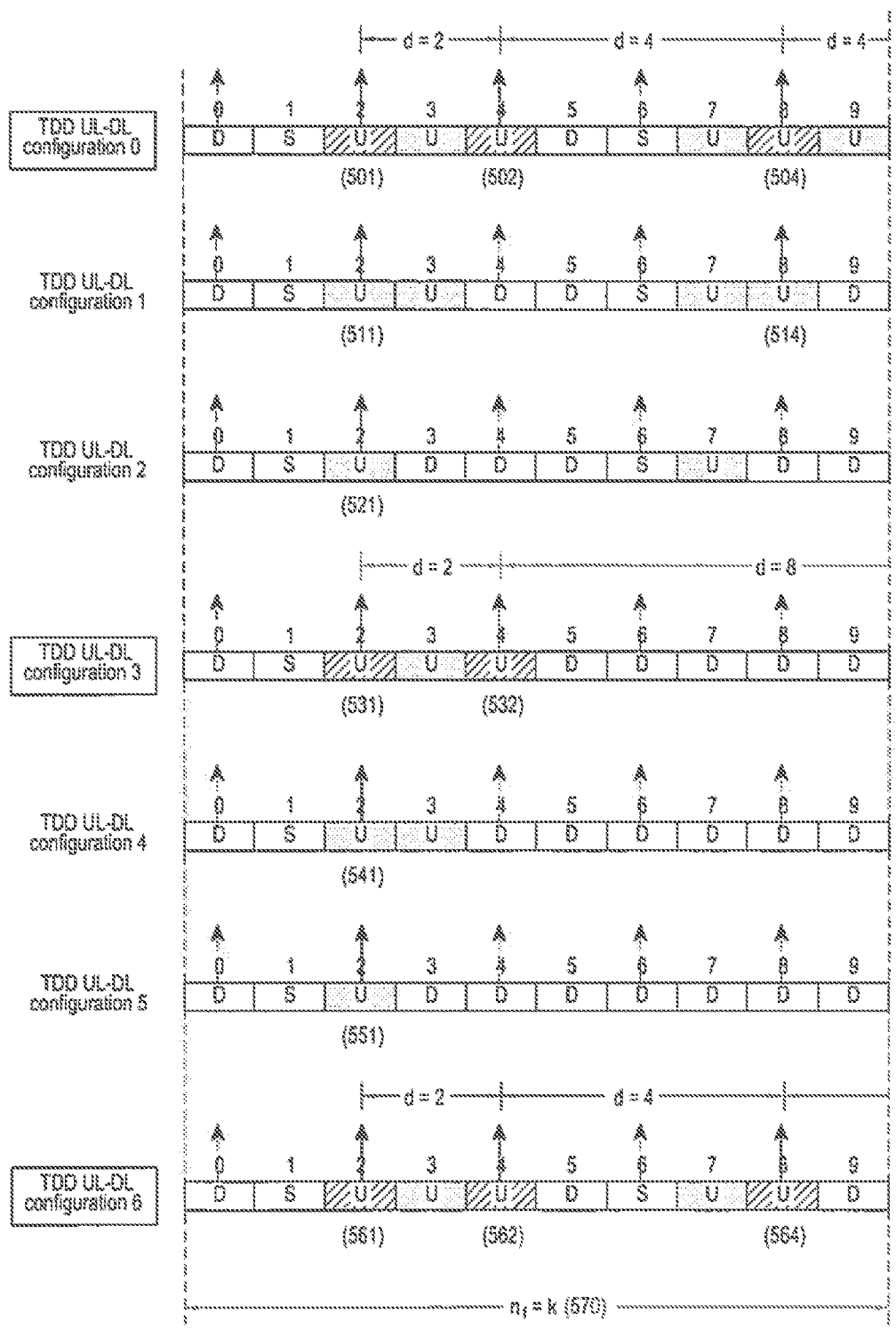
FIGS. 5A and 5B show an example of operation when a CSI transmission period is 2 subframes, according to an embodiment of the present disclosure.
Figure 5B:
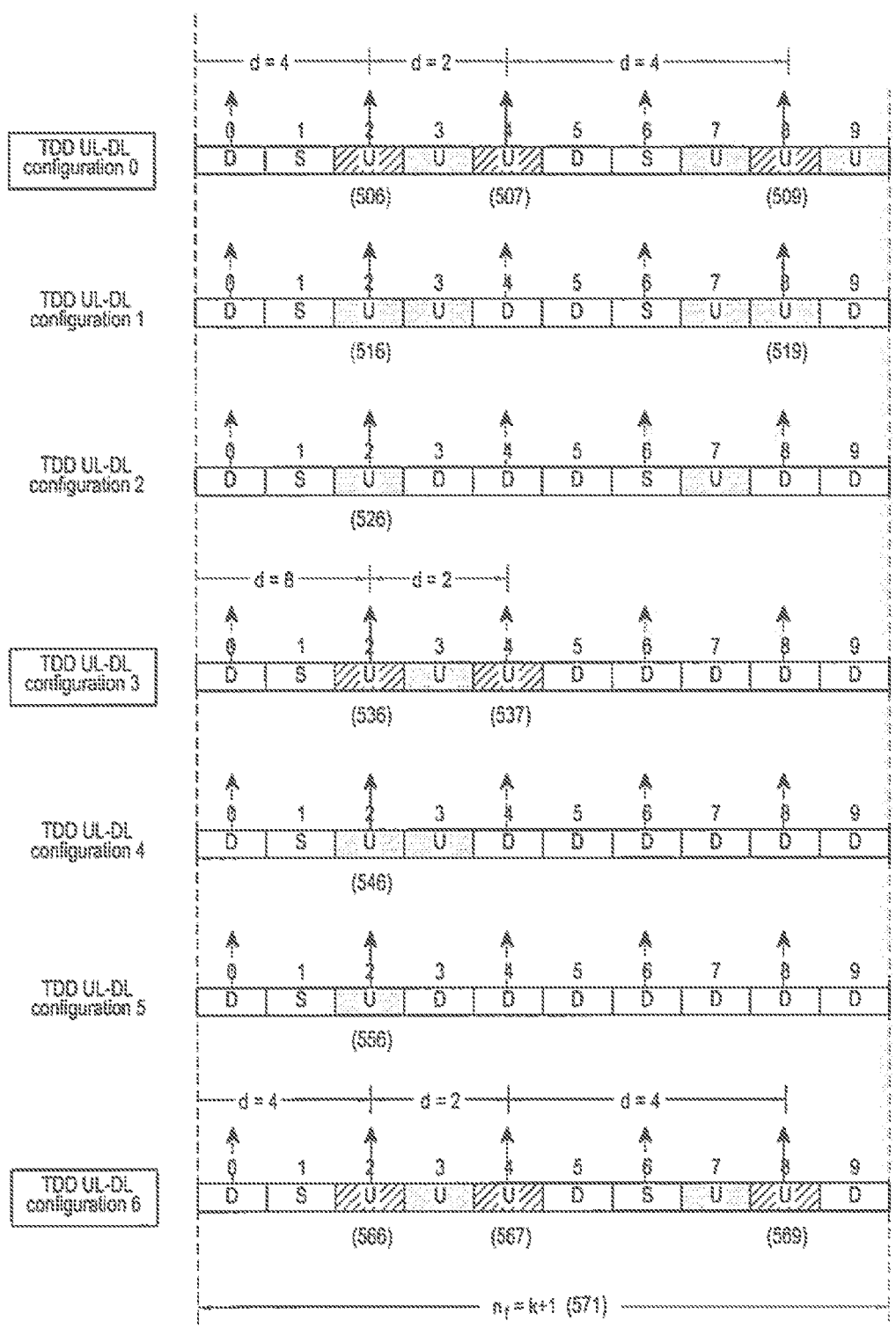

FIGS. 5A and 5B show an example of operation when a CSI transmission period is 2 subframes, according to an embodiment of the present disclosure. FIGS. 5A and 5B show whether an FDD Scell can support $N_{pd}$=2 according to TDD uplink-downlink configurations of a TDD Pcell, when a CSI transmission period of the FDD Scell is 2 subframes ($N_{pd}$=2) and a subframe offset of the FDD Scell is an even number ($N_{OFFSET,CQI}$=0, 2, 4, . . . ).

Referring to FIGS. 5A and 5B, in TDD uplink-downlink configuration#0, if $N_{pd}$=2 and $N_{OFFSET,CQI}$=even number are applied to Equation 1, subframes satisfying Equation 1 may be Subframe#0 500, Subframe#2 501, Subframe#4 502, Subframe#6 503, and Subframe#8 504 of radio frame#k 570, and Subframe#0 505, Subframe#2 506, Subframe#4 507, Subframe#6 508, and Subframe#8 509 of radio frame#k+1 571. Since uplink signal transmission of a UE is allowed only through UL subframes, the UE can perform periodic CSI reporting through the Subframe#2 501, Subframe#4 502, and Subframe#8 504 of the radio frame#k 570, and the Subframe#2 506, Subframe#4 507, and Subframe#8 509 of the radio frame#k+1 571, which are UL subframes satisfying Equation 1. The interval d between adjacent subframes allowing periodic CSI reporting of the UE among the UL subframes satisfying Equation 1 may be 2 subframes between the Subframe#2 501 and the Subframe#4 502, 4 subframes between the Subframe#4 502 and the Subframe#8 504, . . . , which satisfy $N_{pd}$=2 at least one time. The TDD Scell which operates according to the TDD uplink-downlink configuration#0 can partially support the CSI transmission period of the FDD Scell.

As such, the TDD Scell that operates according to the TDD uplink-downlink configuration#0 may be defined to support "periodic CSI reporting" in which the CSI transmission period of the FDD Scell is 2 subframes ($N_{pd}$=2) and the subframe offset of the FDD Scell is an even number ($N_{OFFSET,CQI}$=even number). A condition for determining whether periodic CSI reporting is allowed can be generalized to Equation 2, below.

$$\min(d_{ij}) == N_{pd}, \quad (2)$$

where $d_{ij}$ represents the interval between subframe#i and subframe#j allowing periodic CSI reporting with respect to a specific TDD uplink-downlink configuration, wherein the subframe#i is adjacent to the subframe#j, and min(x) represents a minimum value of x.

Referring again to FIGS. 5A and 5B, if the TDD Pcell operates according to TDD uplink-downlink configuration#0, the UE may perform "periodic CSI reporting" in the order of Subframe#2 501 of radio frame#k 570→Subframe#4 502 of radio frame#k 570→Subframe#8 504 of radio frame#k 570→Subframe#2 506 of radio frame#k+1 571→Subframe#4 507 of radio frame#k+1 571→Subframe#8 509 of radio frame#k+1 571.

Then, in the TDD uplink-downlink configuration#1, if $N_{pd}$=2 and $N_{OFFSET,CQI}$=even number are applied to Equation 1, UL subframes satisfying Equation 1 and allowing "periodic CSI reporting" of the UE may be the Subframe#2 511 and Subframe#8 514 of the radio frame#k 570, and the Subframe#2 516 and Subframe#8 519 of the radio frame#k+1 571. The interval d of the subframes may be 6 subframes between the Subframe#2 511 and the Subframe#8 514, 4 subframes between the Subframe#8 514 and the Subframe#2 516, . . . , which do not satisfy Equation 2.

Accordingly, the TDD uplink-downlink configuration#1 may fail to ensure $N_{pd}=2$ that is to be applied to the FDD Scell.

As such, the TDD Pcell which operates according to the TDD uplink-downlink configuration#1 may be set to not support "periodic CSI reporting" in which the CSI transmission period of the FDD Scell is 2 subframes ($N_{pd}=2$) and the subframe offset is an even number ($N_{OFFSET,CQI}$=even number).

Likewise, by applying the operation to the TDD uplink-downlink configurations#2, #3, #4, #5, and #6, UL subframes satisfying Equation 1 and Equation 2 may be decided according to the TDD uplink-downlink configurations#2, #3, #4, #5, and #6, as follows.

TDD uplink-downlink configuration#2
UL subframes satisfying Equation 1: Subframe#2 521 of radio frame#k 570 and Subframe#2 526 of radio frame#k+1 571
UL subframes satisfying Equation 2: None TDD uplink-downlink configuration#3
UL subframes satisfying Equation 1: Subframe#2 531 and Subframe#4 532 of radio frame#k 570 and Subframe#2 536 and Subframe#4 537 of radio frame#k+1 571
UL subframes satisfying Equation 2: Subframe#2 531 and Subframe#4 532 of radio frame#k 570 and Subframe#2 536 and Subframe#4 537 of radio frame#k+1 571

Accordingly, the UE may perform "periodic CSI reporting" in the order of Subframe#2 531 of radio frame#k 870→Subframe#4 532 of radio frame#k 870→Subframe#2 536 of radio frame#k+1 571→Subframe#4 537 of radio frame#k+1 571, in the TDD Pcell according to the TDD uplink-downlink configuration#3.

TDD uplink-downlink configuration#4
UL subframes satisfying Equation 1: Subframe#2 541 of radio frame#k 570 and Subframe#2 546 of radio frame#k+1 571
UL subframes satisfying Equation 2: None TDD uplink-downlink configuration#5
UL subframes satisfying Equation 1: Subframe#2 551 of radio frame#k 570 and Subframe#2 556 of radio frame#k+1 571
UL subframes satisfying Equation 2: None TDD uplink-downlink configuration#6
UL subframes satisfying Equation 1: Subframe#2 561, Subframe#4 562, and Subframe#8 564 of radio frame#k 570, and Subframe#2 566, Subframe#4 567, and Subframe#8 569 of radio frame#k+1 571
UL subframes satisfying Equation 2: Subframe#2 561, Subframe#4 562, and Subframe#8 564 of radio frame#k 570, and Subframe#2 566, Subframe#4 567, and Subframe#8 569 of radio frame#k+1 571

Accordingly, in the TDD Pcell operating according to the TDD uplink-downlink configuration#6, the UE may perform "periodic CSI reporting" in the order of Subframe#2 561 of radio frame#k 570→Subframe#4 562 of radio frame#k 770→Subframe#8 564 of the radio frame#k 570→Subframe#2 566 of radio frame#k+1 571→Subframe#4 567 of radio frame#k+1 571→Subframe#8 569 of radio frame#k+1 571.

Accordingly, the CSI transmission period ($N_{pd}=2$) of the FDD Scell may be applied to the TDD uplink-downlink configurations #0, #3, and #6 of the TDD Pcell, when $N_{OFFSET,CQI}$=even number.

Figure 6A:
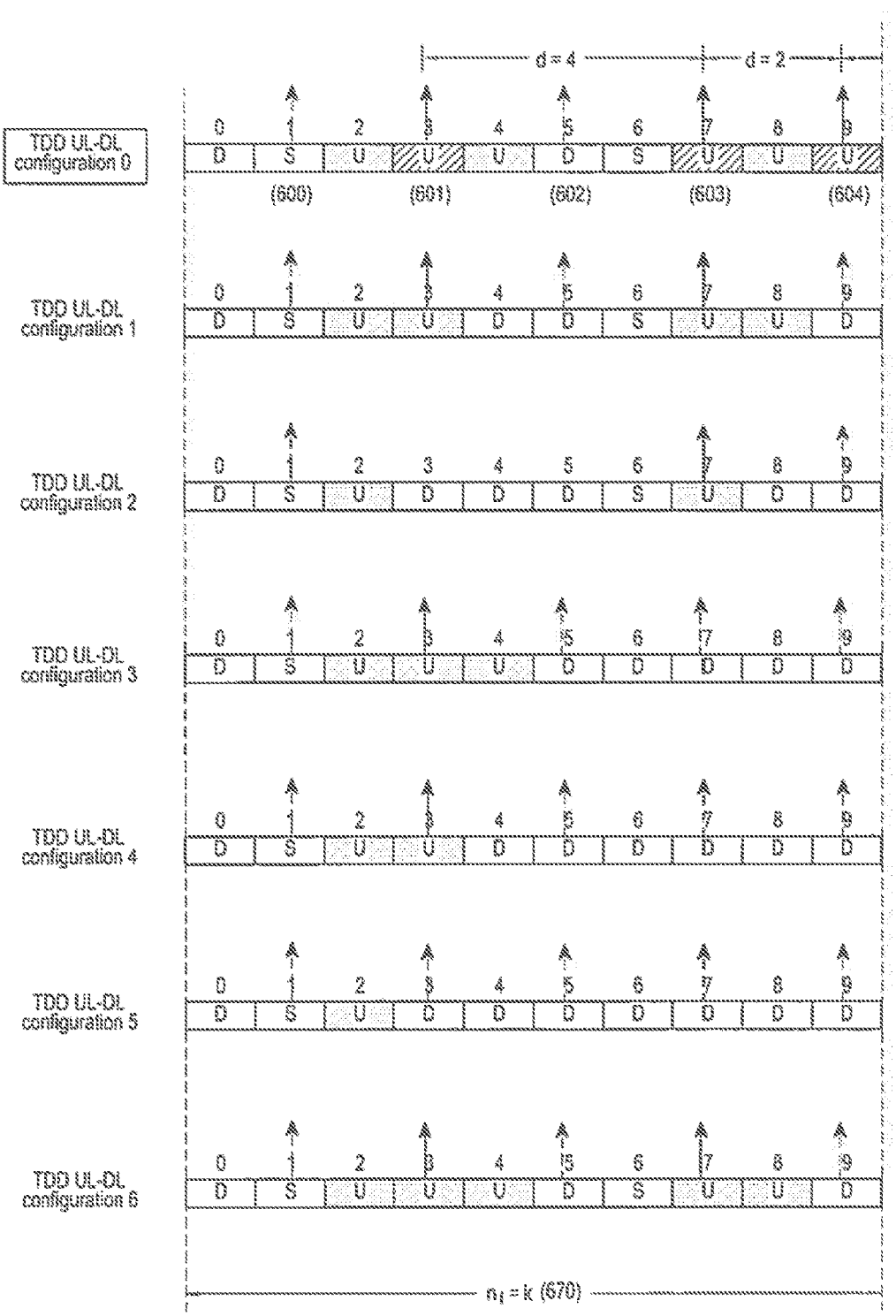
FIGS. 6A and 6B show another example of operation when a CSI transmission period is 2 subframes, according to an embodiment of the present disclosure.
Figure 6B:
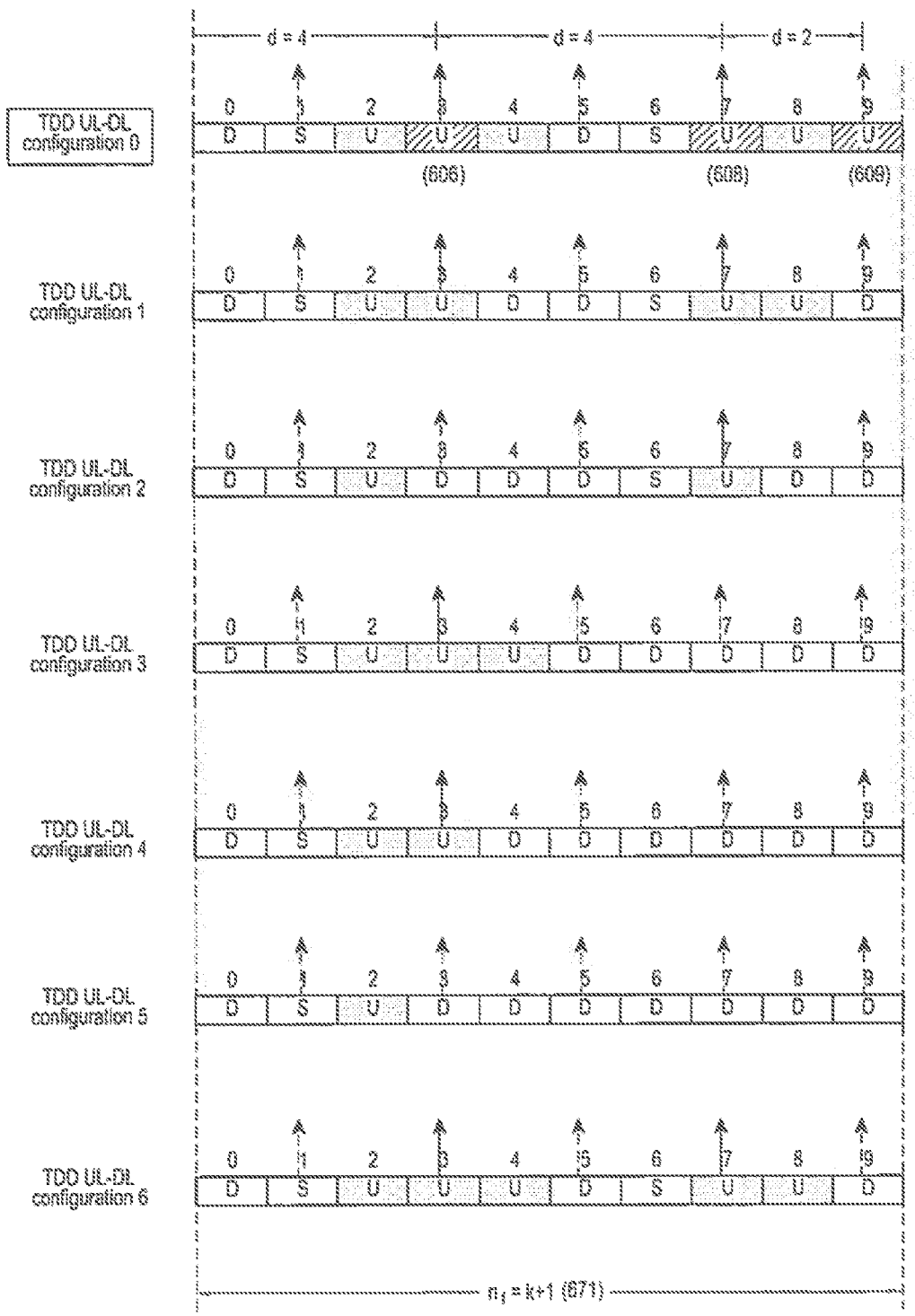

FIGS. 6A and 6B show another example of operation when a CSI transmission period is 2 subframes, according to an embodiment of the present disclosure. FIGS. 6A and 6B show whether an FDD Scell can support $N_{pd}$ according to TDD uplink-downlink configurations of a TDD Pcell, when a CSI transmission period of the FDD Scell is 2 subframes ($N_{pd}=2$) and a subframe offset $N_{OFFSET,CQI}$ of the FDD Scell is an odd number.

Accordingly, the CSI transmission period ($N_{pd}=2$) of the FDD Scell may be applied to the TDD uplink-downlink configuration#0 of the TDD Pcell, when $N_{OFFSET,CQI}$=odd number.

In this case, a UE may perform "periodic CSI reporting" in the order of Subframe#3 601 of radio frame#k 670→Subframe#7 603 of radio frame#k 670→Subframe#9 604 of radio frame#k 670→Subframe#3 606 of radio frame#k+1 671→Subframe#7 608 of radio frame#k+1 671→Subframe#9 609 of radio frame#k+1 671.

As a result, the CSI transmission period ($N_{pd}=2$) of the FDD Scell may support the TDD uplink-downlink configurations#0, #3, and #6, in consideration of all the cases in which $N_{OFFSET,CQI}$ is an even number or an odd number.

Figure 7:
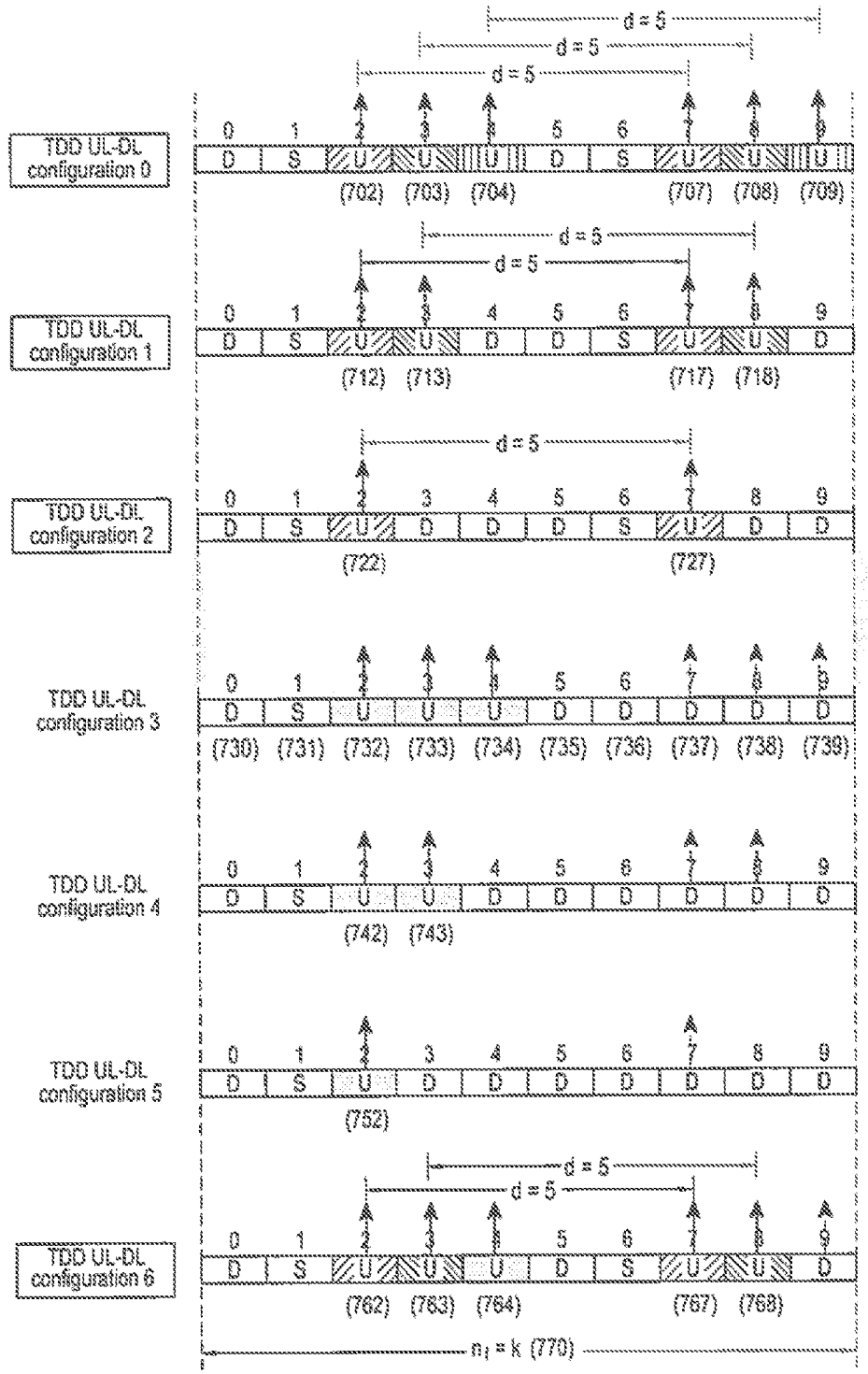
FIG. 7 shows an example of operation when a CSI transmission period is 5 subframes, according to an embodiment of the present disclosure.

FIG. 7 shows an example of operation when a CSI transmission period is 5 subframes, according to an embodiment of the present disclosure. FIG. 7 shows whether an FDD Scell can support $N_{pd}=5$ according to TDD uplink-downlink configurations of a TDD Pcell, when a CSI transmission period of the FDD Scell is 5 subframes ($N_{pd}=5$) and a subframe offset $N_{OFFSET,CQI}$ of the FDD Scell is an arbitrary value.

Referring to FIG. 7, UL subframes satisfying Equation 1 and Equation 2 may be decided according to the TDD uplink-downlink configurations, as follows.

TDD uplink-downlink configuration#0
UL subframes satisfying Equation 1: Subframe#2 702, Subframe#3 703, Subframe#4 704, Subframe#7 707, Subframe#8 708, and Subframe#9 709 of radio frame#k 770
UL subframes satisfying Equation 2: Subframe#2 702, Subframe#3 703, Subframe#4 704, Subframe#7 707, Subframe#8 708, and Subframe#9 709 of radio frame#k 770

Accordingly, a UE may perform "periodic CSI reporting" in the order of Subframe#2 702 of radio frame#k 770→Subframe#7 707 of radio frame#k 770, in the order of Subframe#3 703 of radio frame#k 770→Subframe#8 708 of radio frame#k 770, or in the order of Subframe#4 704 of radio frame#k 770→Subframe#9 709 of radio frame#k 770.

TDD uplink-downlink configuration#1
UL subframes satisfying Equation 1: Subframe#2 712, Subframe#3 713, Subframe#7 717, and Subframe#8 718 of radio frame#k 770
UL subframes satisfying Equation 2: Subframe#2 712, Subframe#3 713, Subframe#7 717, and Subframe#8 718 of radio frame#k 770

Accordingly, the UE may perform "periodic CSI reporting" in the order of Subframe#2 712 of radio frame#k 770→Subframe#7 717 of radio frame#k 770, or in the order of Subframe#3 713 of radio frame#k 770→Subframe#8 718 of radio frame#k 770.

TDD uplink-downlink configuration#2
UL subframes satisfying Equation 1: Subframe#2 722 and Subframe#7 727 of radio frame#k 770
UL subframes satisfying Equation 2: Subframe#2 722 and Subframe#7 727 of radio frame#k 770

Accordingly, the UE may perform "periodic CSI reporting" in the order of Subframe#2 722 of radio frame#k 770→Subframe#7 727 of radio frame#k 770

TDD uplink-downlink configuration#3
UL subframes satisfying Equation 1: Subframe#2 732, Subframe#3 733, and Subframe#4 734 of radio frame#k 770
UL subframes satisfying Equation 2: None TDD uplink-downlink configuration#4

UL subframes satisfying Equation 1: Subframe#2 742 and Subframe#3 743 of radio frame#k 770

UL subframes satisfying Equation 2: None

TDD uplink-downlink configuration#5

UL subframes satisfying Equation 1: Subframe#2 752 of radio frame#k 770

UL subframes satisfying Equation 2: None

TDD uplink-downlink configuration#6

UL subframes satisfying Equation 1: Subframe#2 762, Subframe#3 763, Subframe#4 764, Subframe#7 767, and Subframe#8 768 of radio frame#k 770

UL subframes satisfying Equation 2: Subframe#2 762, Subframe#3 763, Subframe#7 767, and Subframe#8 768 of radio frame#k 770

Accordingly, the UE may perform "periodic CSI reporting" in the order of Subframe#2 762 of radio frame# 770→Subframe#7 767 of radio frame#k 770, or in the order of Subframe#3 763 of radio frame#k 770→Subframe#8 768 of radio frame#k 770.

As a result, the CSI transmission period ($N_{pd}$=5) of the FDD Scell may be applied to the TDD uplink-downlink configurations#0, #1, #2, and #6 of the TDD Pcell.

Figure 8A:
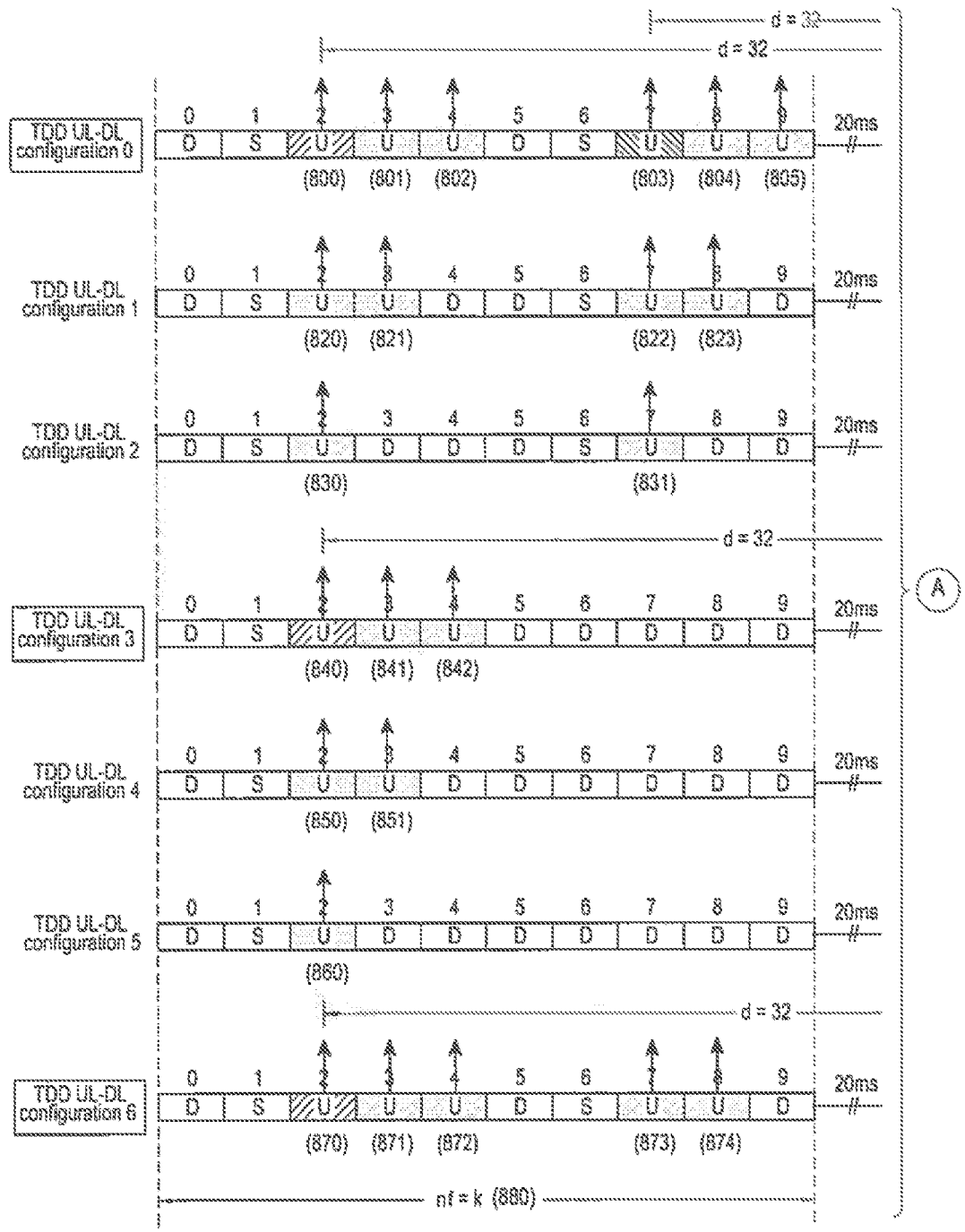
FIGS. 8A and 8B show an example of operation when a CSI transmission period is 32 subframes, according to an embodiment of the present disclosure.
Figure 8B:
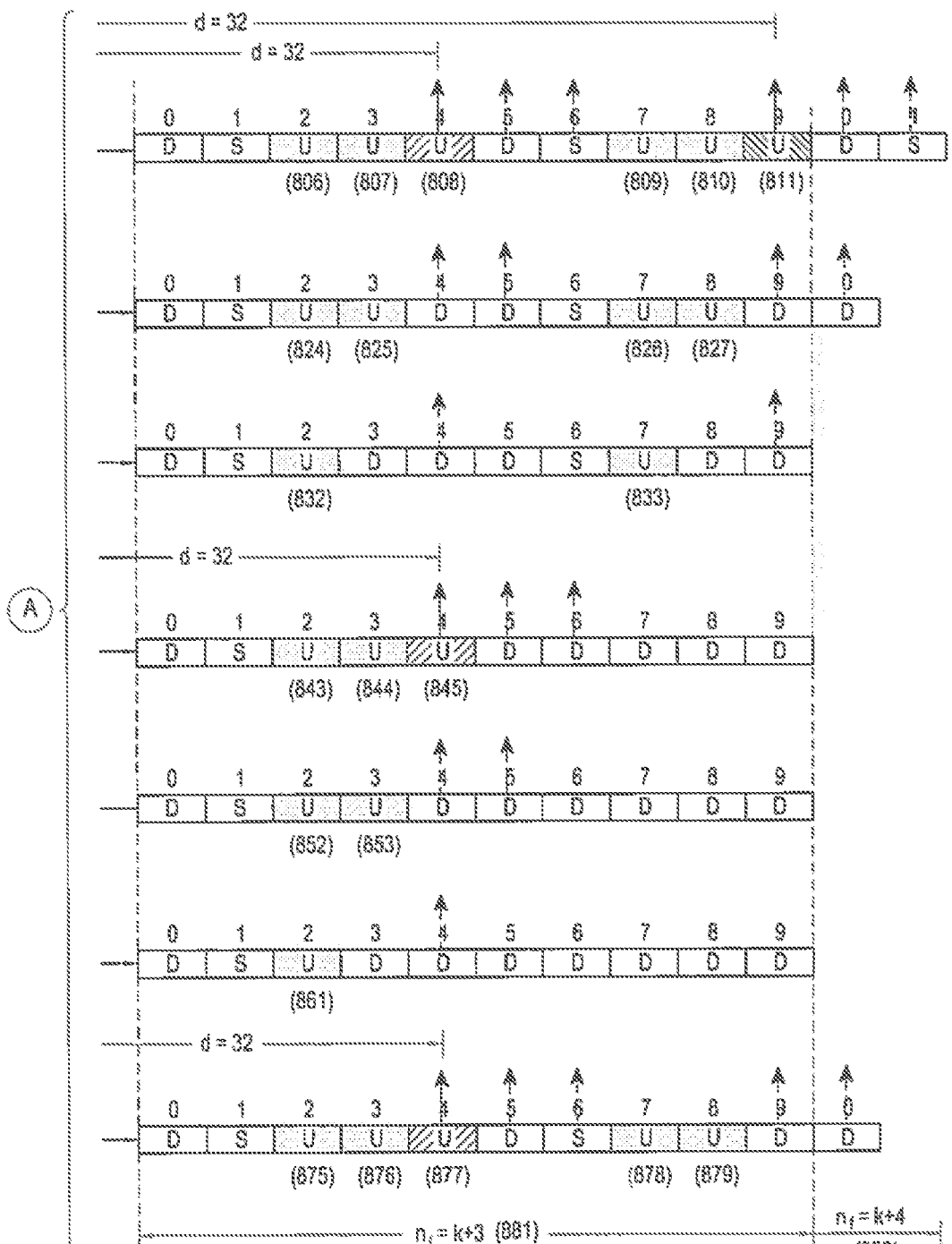

FIGS. 8A and 8B show an example of operation when a CSI transmission period is 32 subframes, according to an embodiment of the present disclosure. FIGS. 8A and 8B show whether an FDD Scell can support $N_{pd}$=32 according to TDD uplink-downlink configurations of a TDD Pcell, when a CSI transmission period of the FDD Scell is 32 subframes ($N_{pd}$=32) and a subframe offset $N_{OFFSET,CQI}$ of the FDD Scell is an arbitrary value.

Referring to FIGS. 8A and 8B, UL subframes satisfying Equation 1 and Equation 2 may be decided according to the TDD uplink-downlink configurations, as follows.

TDD uplink-downlink configuration#0

UL subframes satisfying Equation 1: Subframe#2 800, Subframe#3 801, Subframe#4 802, Subframe#7 803, Subframe#8 804, and Subframe#9 805 of radio frame#k 880, and Subframe#4 808 and Subframe#9 811 of radio frame#k+3 881

UL subframes satisfying Equation 2: Subframe#2 800 and Subframe#7 803 of radio frame#k 880, and Subframe#4 808 and Subframe#9 811 of radio frame#k+3 881

Accordingly, a UE may perform "periodic CSI reporting" in the order of Subframe#2 800 of radio frame#k 880→Subframe#4 808 of radio frame#k+3 881, or in the order of Subframe#7 803 of radio frame#k 880→Subframe#9 811 of radio frame#k+3 881.

TDD uplink-downlink configuration#1

UL subframes satisfying Equation 1: Subframe#2 820, Subframe#3 821, Subframe#7 822, and Subframe#8 823 of radio frame#k 880

UL subframes satisfying Equation 2: None

TDD uplink-downlink configuration#2

UL subframes satisfying Equation 1: Subframe#2 830 and Subframe#7 831 of radio frame#k 880

UL subframes satisfying Equation 2: None

TDD uplink-downlink configuration#3

UL subframes satisfying Equation 1: Subframe#2 840, Subframe#3 841, and Subframe#4 842 of radio frame#k 880, and Subframe#4 845 of radio frame#k+3 881

UL subframes satisfying Equation 2: Subframe#2 840 of the radio frame#k 880 and Subframe#4 845 of radio frame#k+3 881

Accordingly, the UE may perform "periodic CSI reporting" in the order of Subframe#2 840 of radio frame#k 880→Subframe #4 845 of radio frame#k+3 881

TDD uplink-downlink configuration#4

UL subframes satisfying Equation 1: Subframe#2 850 and Subframe#3 851 of radio frame#k 880

UL subframes satisfying Equation 2: None

TDD uplink-downlink configuration#5

UL subframes satisfying Equation 1: Subframe#2 860 of radio frame#k 880

UL subframes satisfying Equation 2: None

TDD uplink-downlink configuration#6

UL subframes satisfying Equation 1: Subframe#2 870, Subframe#3 871, Subframe#4 872, Subframe#7 873, and Subframe#8 874 of radio frame#k 880, and Subframe#4 877 of radio frame#k+3 881

UL subframes satisfying Equation 2: Subframe#2 870 of radio frame#k 880 and Subframe#4 877 of radio frame#k+3 881

Accordingly, the UE may perform "periodic CSI reporting" in the order of Subframe#2 870 of radio frame#k 880→Subframe#4 877 of radio frame#k+3 881.

As a result, the CSI transmission period ($N_{pd}$=32) of the FDD Scell may be applied to the TDD uplink-downlink configurations#0, #3, and #6 of the TDD Pcell.

Figure 9A:
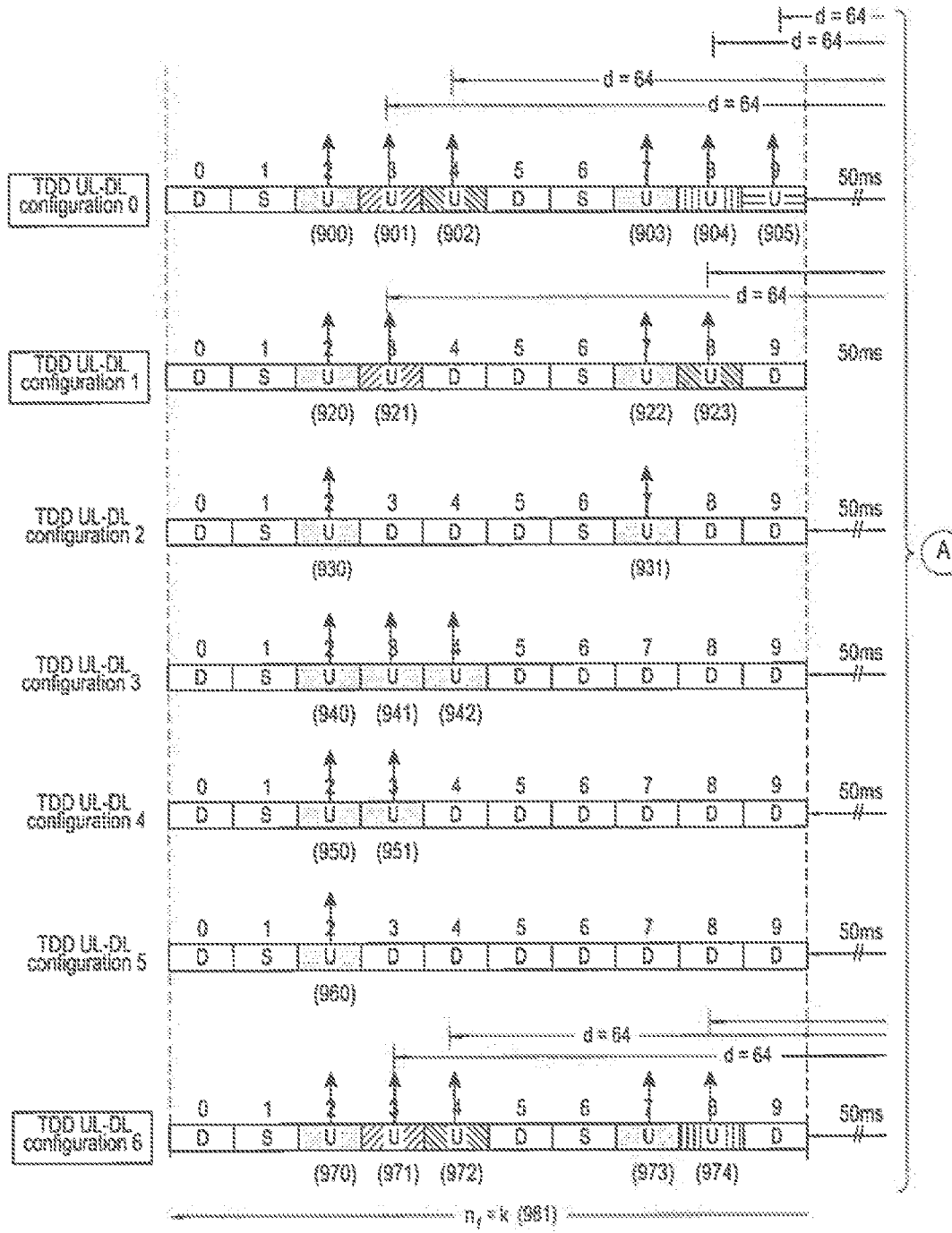
FIGS. 9A and 9B show an example of operation when a CSI transmission period is 64 subframes, according to an embodiment of the present disclosure.
Figure 9B:
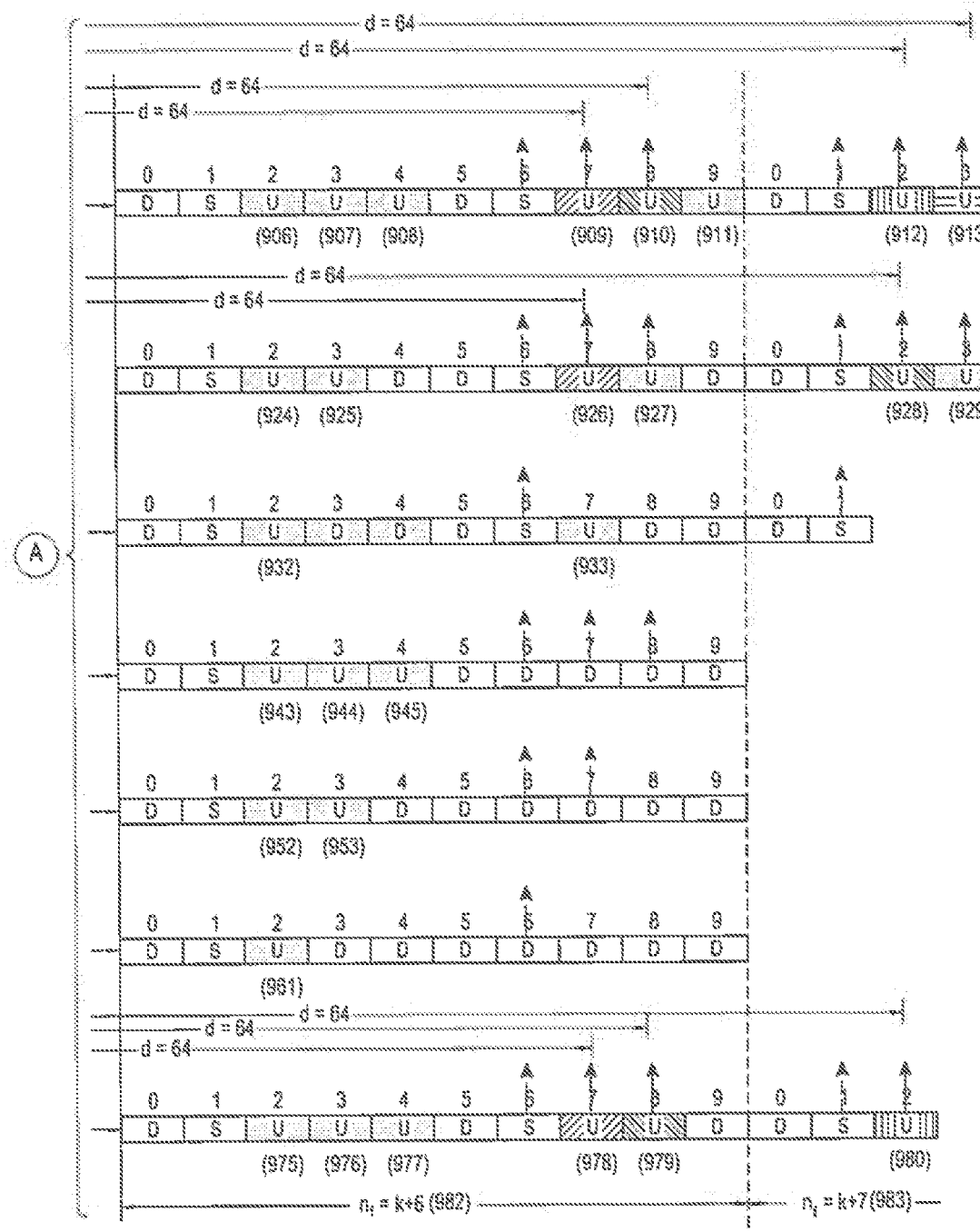

FIGS. 9A and 9B show an example of operation when a CSI transmission period is 64 subframes, according to an embodiment of the present disclosure. FIGS. 9A and 9B show whether an FDD Scell can support $N_{pd}$=64 according to TDD uplink-downlink configurations of a TDD Pcell, when a CSI transmission period of the FDD Scell is 64 subframes ($N_{pd}$=64) and a subframe offset $N_{OFFSET,CQI}$ of the FDD Scell is an arbitrary value.

Referring to FIGS. 9A and 9B, UL subframes satisfying Equation 1 and Equation 2 may be decided according to the TDD uplink-downlink configurations, as follows.

TDD uplink-downlink configuration#0

UL subframes satisfying Equation 1: Subframe#2 900, Subframe#3 901, Subframe#4 902, Subframe#7 903, Subframe#8 904, and Subframe#9 905 of radio frame#k 981, Subframe#7 909 and Subframe#8 910 of radio frame#k+6 982, and Subframe#2 912 and Subframe#3 913 of radio frame#k+7 983 UL subframes satisfying Equation 2: Subframe#3 901, Subframe#4 902, Subframe#8 904, and Subframe#9 905 of radio frame#k 981, Subframe#7 909 and Subframe#8 910 of radio frame#k+6 982, and Subframe#2 912 and Subframe#3 913 of radio frame#k+7 983

Accordingly, the UE may perform "periodic CSI reporting" in the order of Subframe#3 901 of radio frame#k 981→Subframe#7 909 of radio frame#k+6 982, in the order of Subframe#4 902 of radio frame#k 981→Subframe#8 910 of radio frame#k+6 982, in the order of Subframe#8 904 of radio frame#k 981→Subframe#2 912 of radio frame#k+7 983, or in the order of Subframe#9 905 of radio frame#k 981→Subframe#3 913 of radio frame#k+7 983.

TDD uplink-downlink configuration#1

UL subframes satisfying Equation 1: Subframe#2 920, Subframe#3 921, Subframe#7 922, and Subframe#8 923 of radio frame#k 981, Subframe#7 926 and Subframe#8 927 of radio frame#k+6 982, and Subframe#2 928 and Subframe#3 929 of radio frame#k+7 983

UL subframes satisfying Equation 2: Subframe#3 921 and Subframe#8 923 of radio frame#k 981, Subframe#7 926 of radio frame#k+6 982, and Subframe#2 928 of radio frame#k+7 983

Accordingly, the UE may perform "periodic CSI reporting" in the order of Subframe#3 921 of radio frame#k 981→Subframe#7 926 of radio frame#k+6 982, or in the order of Subframe#8 923 of radio frame#k 981→Subframe#2 928 of radio frame#k+7 983.

Figure 10A:
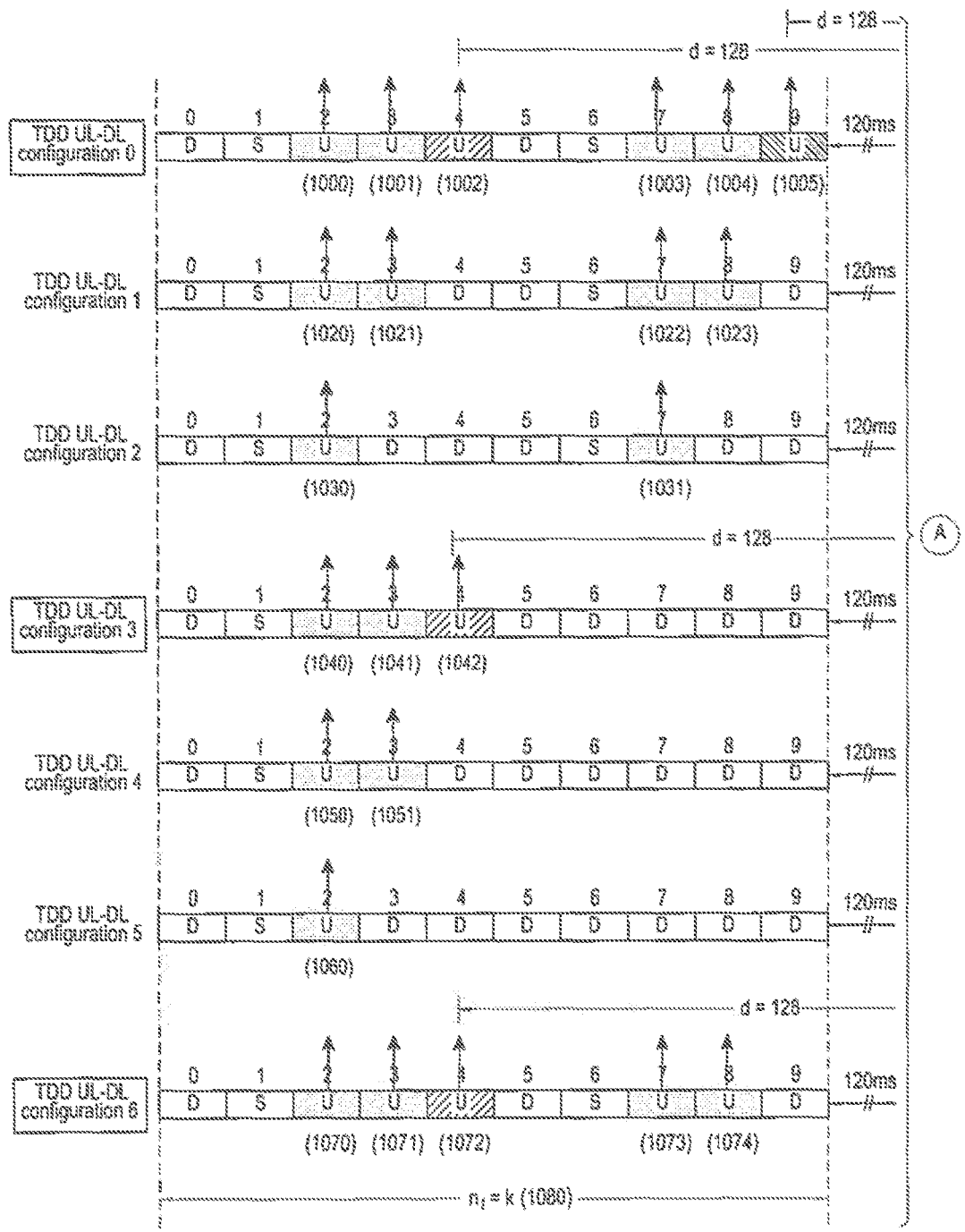
FIGS. 10A and 10B shows an example of operation when a CSI transmission period is 128 subframes, according to an embodiment of the present disclosure.
Figure 10B:
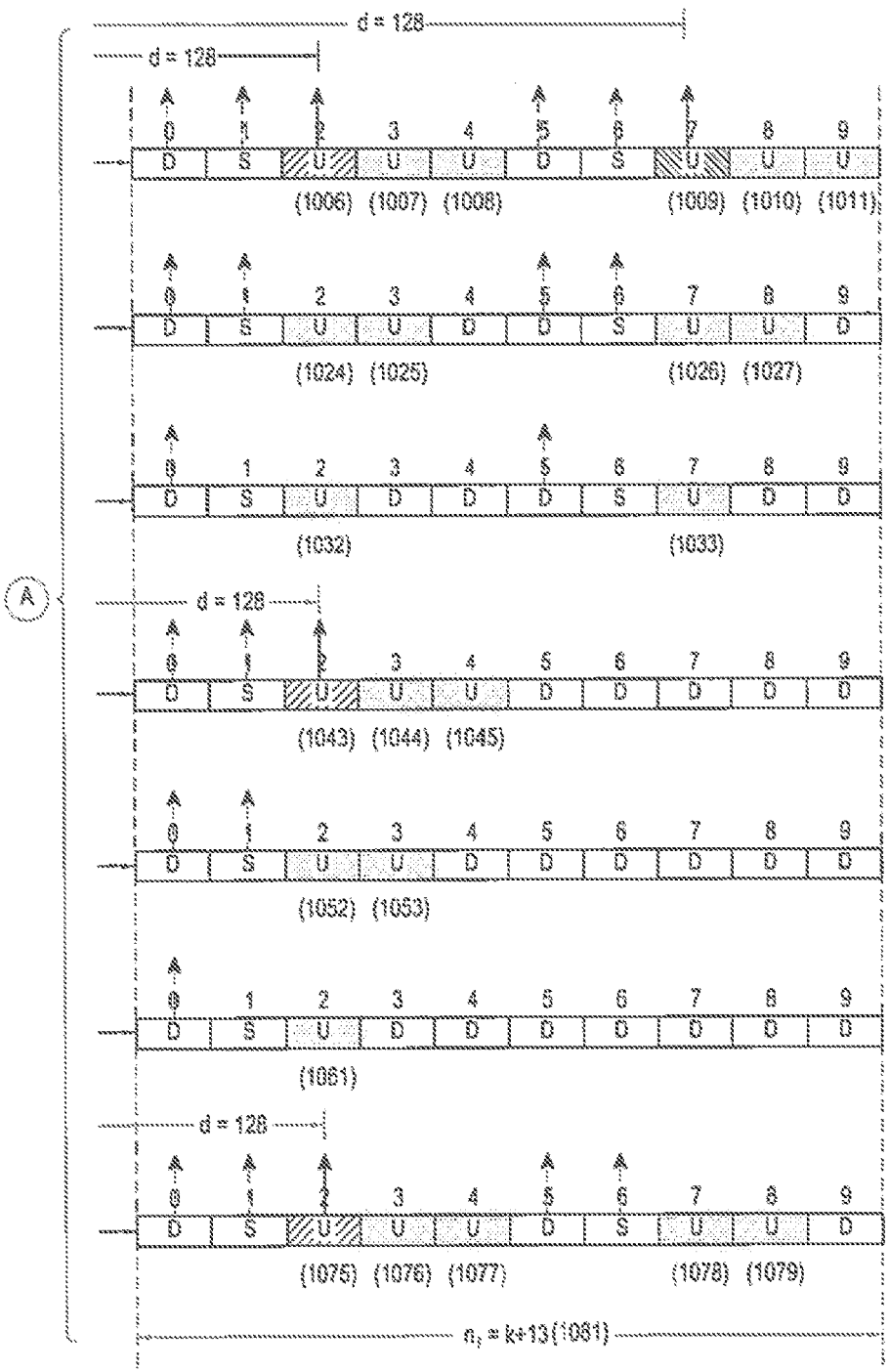

TDD uplink-downlink configuration#2
UL subframes satisfying Equation 1: Subframe#2 930 and Subframe#7 931 of radio frame#k 981
UL subframes satisfying Equation 2: None
TDD uplink-downlink configuration#3
UL subframes satisfying Equation 1: Subframe#2 940, Subframe#3 941, and Subframe#4 942 of radio frame#k 981
UL subframes satisfying Equation 2: None
TDD uplink-downlink configuration#4
UL subframes satisfying Equation 1: Subframe#2 950 and Subframe#3 951 of radio frame#k 981
UL subframes satisfying Equation 2: None
TDD uplink-downlink configuration#5
UL subframes satisfying Equation 1: Subframe#2 960 of radio frame#k 981
UL subframes satisfying Equation 2: None
TDD uplink-downlink configuration#6
UL subframes satisfying Equation 1: Subframe#2 970, Subframe#3 971, Subframe#4 972, Subframe#7 973, and Subframe#8 974 of radio frame#k 981, Subframe#7 978 and Subframe#8 979 of radio frame#k+6 982, and Subframe#2 980 of radio frame#k+7 983
UL subframes satisfying Equation 2: Subframe#3 971, Subframe#4 972, and Subframe#8 974 of radio frame#k 981, Subframe#7 978 and Subframe#8 979 of radio frame#k+6 982, and Subframe#2 980 of radio frame#k+7 983
Accordingly, the UE may perform "periodic CSI reporting" in the order of Subframe#3 971 of radio frame#k 981→Subframe#7 978 of radio frame#k+6 982, in the order of Subframe#4 972 of radio frame#k 981→Subframe#8 979 of radio frame#k+6 982, or in the order of Subframe#8 974 of radio frame#k 981→Subframe#2 980 of radio frame#k+7 983.
As a result, the CSI transmission period ($N_{pd}$=64) of the FDD Scell may be applied to the TDD uplink-downlink configurations #0, #1, and #6 of the TDD Pcell.
FIGS. 10A and 10B shows an example of operation when a CSI transmission period is 128 subframes, according to an embodiment of the present disclosure. FIGS. 9A and 9B show whether an FDD Scell can support $N_{pd}$=128 according to TDD uplink-downlink configurations of a TDD Pcell, when a CSI transmission period of the FDD Scell is 128 subframes ($N_{pd}$=128) and a subframe offset $N_{OFFSET,CQI}$ of the FDD Scell is an arbitrary value.
Referring to FIGS. 10A and 10B, UL subframes satisfying Equation 1 and Equation 2 may be decided according to the TDD uplink-downlink configurations, as follows.
TDD uplink-downlink configuration#0
UL subframes satisfying Equation 1: Subframe#2 1000, Subframe#3 1001, Subframe#4 1002, Subframe#7 1003, Subframe#8 1004, and Subframe#9 1005 of radio frame#k 1080, and Subframe#2 1006 and Subframe#7 1009 of radio frame#k+13 1081
UL subframes satisfying Equation 2: Subframe#4 1002 and Subframe#9 1005 of radio frame#k 1080, and Subframe#2 1006 and Subframe#7 1009 of radio frame#k+13 1081
Accordingly, a UE may perform "periodic CSI reporting" in the order of Subframe#4 1002 of radio frame#k 1080→Subframe#2 1006 of radio frame#k+13 1081, or in the order of Subframe#9 1005 of radio frame#k 1080→Subframe#7 1009 of radio frame#k+13 1081.
TDD uplink-downlink configuration#1
UL subframes satisfying Equation 1: Subframe#2 1020, Subframe#3 1021, Subframe#7 1022, and Subframe#8 1023 of radio frame#k 1080
UL subframes satisfying Equation 2: None
TDD uplink-downlink configuration#2
UL subframes satisfying Equation 1: Subframe#2 1030 and Subframe#7 1031 of radio frame#k 1080
UL subframes satisfying Equation 2: None
TDD uplink-downlink configuration#3
UL subframes satisfying Equation 1: Subframe#2 1040, Subframe#3 1041, and Subframe#4 1042 of radio frame#k 1080, and Subframe#2 1043 of radio frame #k+13 1081
UL subframes satisfying Equation 2: Subframe#4 1042 of radio frame#k 1080, and Subframe#2 1043 of radio frame#k+13 1081
Accordingly, the UE may perform "periodic CSI reporting" in the order of Subframe#4 1042 of radio frame#k 1080→Subframe#2 1043 of radio frame#k+13 1081.
TDD uplink-downlink configuration#4
UL subframes satisfying Equation 1: Subframe#2 1050 and Subframe#3 1051 of radio frame#k 1080
UL subframes satisfying Equation 2: None
TDD uplink-downlink configuration#5
UL subframes satisfying Equation 1: Subframe#2 1060 of radio frame#k 1080
UL subframes satisfying Equation 2: None
TDD uplink-downlink configuration#6
UL subframes satisfying Equation 1: Subframe#2 1070, Subframe#3 1071, Subframe#4 1072, Subframe#7 1073, and Subframe#8 1074 of radio frame#k 1080, and Subframe#2 1075 of radio frame#k+13 1031
UL subframes satisfying Equation 2: Subframe#7 1072 of radio frame#k 1080, and Subframe#2 1075 of radio frame#k+13 1031
Accordingly, the UE may perform "periodic CSI reporting" in the order of Subframe#4 1072 of radio frame#k 1080→Subframe#2 1075 of radio frame#k+13 1081.
As a result, the CSI transmission period ($N_{pd}$=128) of the FDD Scell may be applied to the TDD uplink-downlink configurations#0, #3, and #6 of the TDD Pcell.
Since all the TDD uplink-downlink configurations satisfy periodicity of 10 ms, the CSI transmission periods $N_{pd}$ {10, 20, 40, 80, 160} of the FDD Scell, corresponding to multiples of 10, may be applied to all the TDD uplink-downlink configurations.
In summary, in the first embodiment, TDD uplink-downlink configurations that can be applied for each CSI transmission period Ni of the FDD Scell may be decided as shown in Table 2.

TABLE 2

| $N_{pd}$ (FDD Scell) | TDD Uplink-downlink configuration (TDD Pcell) |
|---|---|
| 2 | {0, 3, 6} |
| 5 | {0, 1, 2, 6} |
| 32 | {0, 3, 6} |
| 64 | {0, 1, 6} |
| 128 | {0, 3, 6} |
| {10, 20, 40, 80, 160} | {0, 1, 2, 3, 4, 5, 6} |

In other words, if the TDD Pcell has the TDD uplink-downlink configuration#0, the $N_{pd}$ of the FDD Scell may be selected from {2, 5, 32, 64, 128} and {10, 20, 40, 80, 160}, if the TDD Pcell has the TDD uplink-downlink configuration#1, the $N_{pd}$ of the FDD Scell may be selected from {5, 64} and {10, 20, 40, 80, 160}, if the TDD Pcell has the TDD uplink-downlink configuration#2, the $N_{pd}$ of the FDD Scell may be selected from {5} and {10, 20, 40, 80, 160}, if the TDD Pcell has the TDD uplink-downlink configuration#3, the $N_{pd}$ of the FDD Scell may be selected from {2, 32, 128} and {10, 20, 40, 80, 160}, if the TDD Pcell has the TDD uplink-downlink configurations#4 and #5, the $N_{pd}$ of the FDD Scell may be selected from {10, 20, 40, 80, 160}, if the TDD Pcell has the TDD uplink-downlink configuration#6, the $N_{pd}$ of the FDD Scell may be selected from {2, 5, 32, 64, 128} and {10, 20, 40, 80, 160}.

Figure 11:
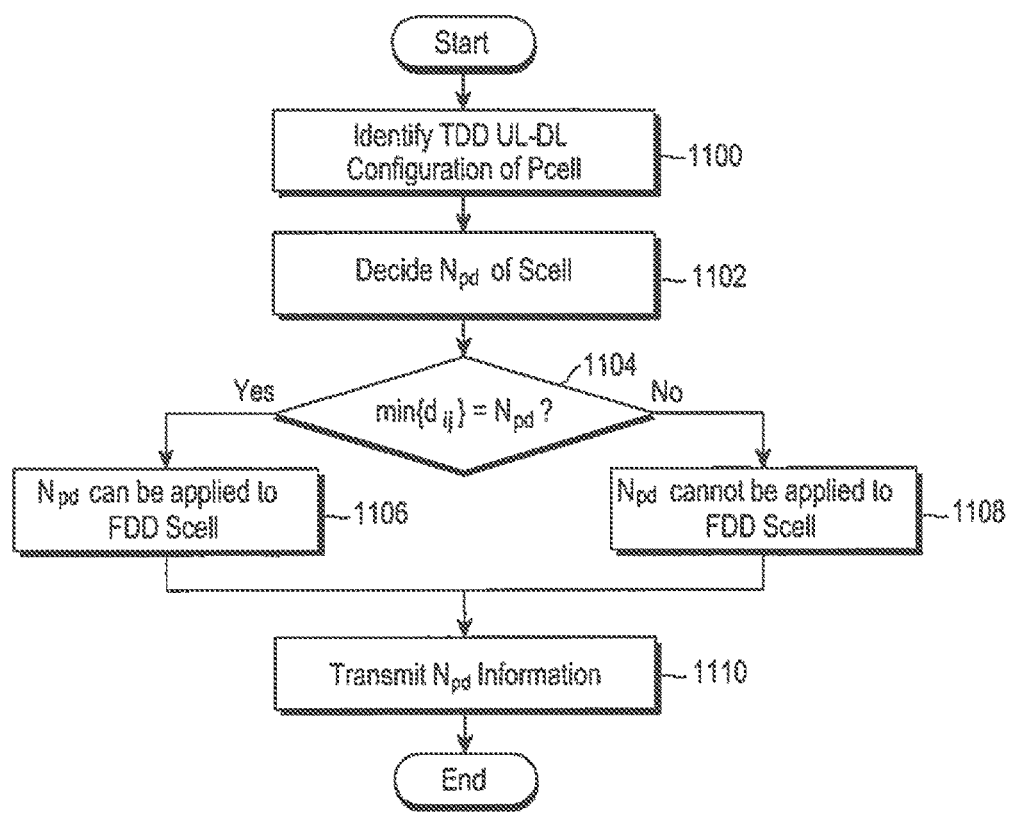
FIG. 11 is a flowchart illustrating a method of setting a CSI transmission period, according to an embodiment of the present disclosure.

FIG. 11 is a flowchart illustrating a method of setting a CSI transmission period $N_{pd}$, according to an embodiment of the present disclosure.

Referring to FIG. 11, in operation 1100, a NB may identify a TDD uplink-downlink configuration defined for a TDD Pcell of a UE. The TDD uplink-downlink configuration may have been decided, when the TDD Pcell for the UE was configured, in consideration of an uplink-downlink traffic state of the TDD Pcell, TDD uplink-downlink configurations of neighboring cells, etc.

Then, in operation 1102, the NB may decide a CSI transmission period $N_{pd}$ that is to be set for an FDD Scell. More specifically, the NB may select one from {2, 5, 10, 20, 40, 80, 160, 32, 64, 128} that can be set for an FDD Scell.

Then, in operation 1104, the NB may determine whether UL subframes of the TDD Pcell satisfying Equation 1 with respect to the CSI transmission period $N_{pd}$ satisfy Equation 2. If the NB determines that the UL subframes of the TDD Pcell satisfy Equation 2, the NB may decide the CSI transmission period Ni as a CSI transmission period $N_{pd}$ of the FDD Scell, in operation 1106, include information about the decided CSI transmission period $N_{pd}$ in a predetermined signaling message, and then transmit the predetermined signaling message to the UE, in operation 1110. Meanwhile, if the NB determines that the UL subframes of the TDD Pcell do not satisfy Equation 2, the NB may return to operation 1102 to again set a CSI transmission period $N_{pd}$ in operation 1108.

According to another embodiment, if a Pcell configured for a UE is a TDD mode, and a Scell is an FDD mode, the NB may identify a TDD uplink-downlink configuration of the TDD Pcell, and acquire a set of CSI transmission periods of the FDD Scell that can be used for the TDD uplink-downlink configuration. For example, the NB may include a memory that stores groups of CSI transmission periods for TDD uplink-downlink configurations of a TDD Pcell, based on Table 2. Then, the CSI transmission period of the FDD Scell may be selected from the acquired set of CSI transmission periods according to a predetermined condition.

Second Embodiment

In a CA system in which a cell (also, referred to as an FDD cell) using the FDD scheme and a cell (also, referred to as a TDD cell) using the TDD scheme are aggregated and operated, when the TDD cell is configured with a frequency f1 to operate as a Pcell (hereinafter, the TDD cell is referred to as a TDD Pcell), and the FDD cell is configured with an uplink frequency f2 and a downlink frequency f3 to operate as a Scell (hereinafter, the FDD cell is referred to as an FDD Scell), operation for performing "periodic CSI reporting" for the FDD Scell through the TDD Pcell will be described in detail, below.

In the second embodiment, although a CSI transmission period $N_{pd}$ that can be set for the FDD Scell is not limited according to TDD uplink-downlink configurations of the TDD Pcell, the CSI transmission period for the FDD Scell may be selected from {2, 5, 10, 20, 40, 80, 160, 32, 64, 128} that are CSI transmission periods $N_{pd}$ that can be set for an FDD cell, like in the typical LTE and LTE-A system. A UE may perform "periodic CSI reporting" in UL subframes of the TDD Pcell satisfying Equation 1. Accordingly, in some cases, the UE may report CSI at time intervals that are longer than a CSI transmission period set by the NB.

For example, referring to FIGS. 5A and 5B, if $N_{pd}$=2 and $N_{OFFSET,CQI}$=even number with respect to an FDD Scell, and a TDD Pcell is configured to 0 the TDD uplink-downlink configuration#4, UL subframes satisfying Equation 1 and allowing "periodic CSI reporting" may be Subframe#2 541 of radio frame#k 570 and Subframe#2 546 of radio frame#k+1 571. Accordingly, the UE may perform "periodic CSI reporting" in the order of Subframe#2 541 of radio frame#k 570→Subframe#2 546 of radio frame#k+1 571. A time interval between the Subframe#2 541 of the radio frame#k 570 and the Subframe#2 546 of the radio frame#k+1 571 may be 10 subframes which is longer than the CSI transmission period ($N_{pd}$=2) set to be applied to the FDD Scell. That is, although a CSI transmission period $N_{pd}$ that can be set by a NB with respect to an FDD Scell is not limited, a CSI transmission period in which a UE actually performs "periodic CSI reporting" may be lengthened.

Third Embodiment

In a CA system in which a cell (also, referred to as an FDD cell) using the FDD scheme and a cell (also, referred to as a TDD cell) using the TDD scheme are aggregated and operated, when the TDD cell is configured with a frequency f1 to operate as a Pcell (hereinafter, the TDD cell is referred to as a TDD Pcell), and the FDD cell is configured with an uplink frequency f2 and a downlink frequency f3 to operate as a Scell (hereinafter, the FDD cell is referred to as an FDD Scell), operation for performing "periodic CSI reporting" for the FDD Scell through the TDD Pcell will be described in detail, below.

According to the third embodiment, in the CA, a CSI transmission period $N_{pd}$ that can be applied to an FDD Scell may be set based on a separate group decided in consideration of possible CSI transmission periods of a TDD cell, instead of {2, 5, 10, 20, 40, 80, 160, 32, 64, 128} decided for an FDD cell of a single carrier wave.

Method 1: CSI transmission periods $N_{pd}$ that can be applied to an FDD Scell may be selected from among CSI transmission periods $N_{pd}$ that can be applied to a TDD Pcell. That is, a group of CSI transmission periods $N_{pd}$ that can be applied to an FDD Scell may be {1, 5, 10, 20, 40, 80, 160}. A NB may select an element from the group to decide $N_{pd}$ for an FDD Scell configured for a UE, and transmit information about the selected $N_{pd}$ to the UE. The UE may perform "periodic CSI reporting" in UL subframes of the TDD Pcell satisfying Equation 1, based on the $N_{pd}$ indicated by the NB. Herein, $N_{pd}$=1 means that CSI reporting is performed in all UL subframes of the TDD Pcell.

Method 2: CSI transmission periods $N_{pd}$ that can be applied to an FDD Scell may be selected from a group {5, 10, 20, 40, 80, 160} that can be applied in common to TDD cells and FDD cells. A NB may select an element from the group to decide $N_{pd}$ for an FDD Scell configured for a UE, and transmit information about the selected $N_{pd}$ to the UE. The UE may perform "periodic CSI reporting" in UL subframes of the TDD Pcell satisfying Equation 1, based on the $N_{pd}$ indicated by the NB.

According to the third embodiment, the NB and UE may set a CSI transmission period $N_{pd}$ that is applied to the FDD Scell or the FDD cell, according to whether CA has been configured between the FDD cell and the TDD cell.

Figure 12:
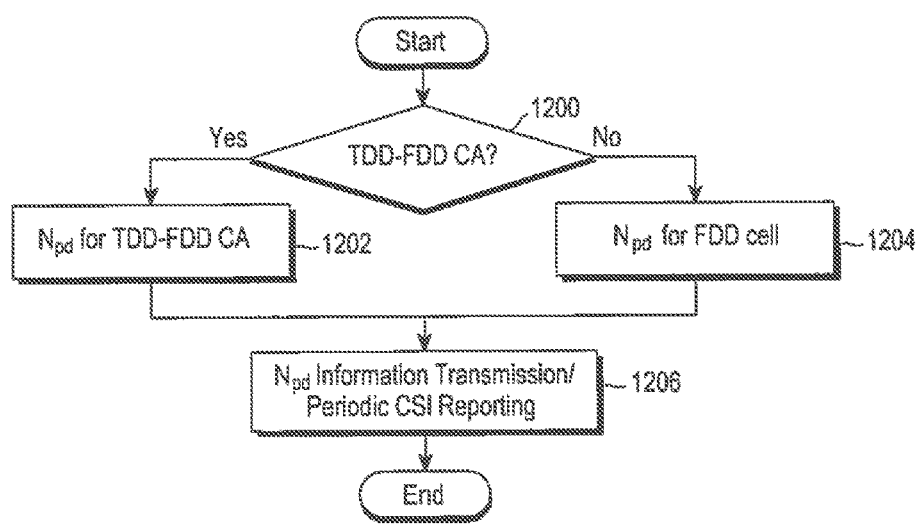
FIG. 12 is a flowchart illustrating a method of setting a CSI transmission period, according to another embodiment of the present disclosure.

FIG. 12 is a flowchart illustrating a method of setting a CSI transmission period, according to another embodiment of the present disclosure. The flowchart shown in FIG. 12 can be applied to both a NB and a UE.

First, operation of a NB will be described with reference to FIG. 12, below. In operation 1200, the NB may determine whether CA has been configured between a TDD cell and an FDD cell with respect to a UE. If the NB determines that CA has been configured between the TDD cell and the FDD cell, the NB may set a CSI transmission period $N_{pd}$ that is applied to an FDD Scell, based on {1, 5, 10, 20, 40, 80, 160} according to Method 1 and {5, 10, 20, 40, 80, 160} according to Method 2, in operation 1202.

Meanwhile, if the NB determines that no CA has been configured between the TDD cell and the FDD cell, that is, if the FDD cell has been configured alone with respect to the UE, or if CA has been configured between FDD cells, the NB may set a CSI transmission period $N_{pd}$ that is applied to the FDD Scell, based on a group of CSI transmission periods $N_{pd}$ defined for FDD cells of the typical LTE and LTE-A system, in operation 1204.

Then, in operation 1206, the NB may transmit information about the $N_{pd}$ to the UE. Then, the UE may periodically report CSI for the FDD Scell in UL subframes of the TDD Pcell satisfying Equation 1, based on the received information about the $N_{pd}$.

According to another embodiment, if the UE is configured to select $N_{pd}$ through the same algorithm as that used in the NB, the NB may omit operation 1206 of transmitting information about $N_{pd}$, and the UE may itself decide $N_{pd}$ without receiving information about $N_{pd}$ from the NB, and periodically report CSI for the FDD Scell using the decided $N_{pd}$.

Now, operation of the UE will be described with reference to FIG. 12. In operation 1200, the UE may determine whether CA between the TDD cell and the FDD cell has been configured by the NB. If the UE determines that CA between the TDD cell and the FDD cell has been configured, the UE may set a CSI transmission period $N_{pd}$ that is applied to the FDD Scell, based on {1, 5, 10, 20, 40, 80, 160} according to Method 1 or {5, 10, 20, 40, 80, 160} according to Method 2, in operation 1202.

In contrast, if the UE determines that no CA between the TDD cell and the FDD cell has been configured, that is, if the FDD cell has been configured alone with respect to the UE, or if CA has been configured between FDD cells, the UE may set a CSI transmission period $N_{pd}$ that is applied to the FDD Scell, based on a group of CSI transmission periods $N_{pd}$ defined for FDD cells of the typical LTE and LTE-A system, in operation 1204.

Then, in operation 1206, the UE may perform "periodic CSI reporting" for the FDD Scell, based on the set $N_{pd}$. According to another embodiment, the UE may receive information about $N_{pd}$ from the NB, instead of itself setting $N_{pd}$, and perform "periodic CSI reporting" for the FDD Scell based on the received $N_{pd}$.

Fourth Embodiment

In a CA system in which a cell (also, referred to as an FDD cell) using the FDD scheme and a cell (also, referred to as a TDD cell) using the TDD scheme are aggregated and operated, when the TDD cell is configured with a frequency f1 to operate as a Scell (hereinafter, the TDD cell is referred to as a TDD Scell), and the FDD cell is configured with an uplink frequency f2 and a downlink frequency f3 to operate as a Pcell (hereinafter, the FDD cell is referred to as an FDD Pcell), operation for performing "periodic CSI reporting" for the TDD Scell through the FDD Pcell will be described in detail, below.

A CSI transmission period $N_{pd}$ for the TDD Scell may be set to one of CSI transmission periods $N_{pd}$ that can be applied to TDD cells, regardless of whether CA has been configured. That is, one of {1, 5, 10, 20, 40, 80, 160} that can be set for TDD cells of the typical LTE and LTE-A system may be selected as $N_{pd}$ of the TDD Scell, and the NB may transmit information about the selected $N_{pd}$ to the UE. The UE may perform "periodic CSI reporting" in UL subframes of the PDD Pcell satisfying Equation 1, based on the $N_{pd}$ indicated by the NB. Accordingly, periodic CSI reporting for the TDD Scell may be performed in each subframe ($N_{pd}=1$) through the FDD Pcell.

Fifth Embodiment

In a CA system in which a cell (also, referred to as an FDD cell) using the FDD scheme and a cell (also, referred to as a TDD cell) using the TDD scheme are aggregated and operated, when the TDD cell is configured with a frequency f1 to operate as a Scell (hereinafter, the TDD cell is referred to as a TDD Scell), and the FDD cell is configured with an uplink frequency f2 and a downlink frequency f3 to operate as a Pcell (hereinafter, the FDD cell is referred to as an FDD Pcell), operation for performing "periodic CSI reporting" for the TDD Scell through the FDD Pcell will be described in detail, below.

If CA has been configured, a CSI transmission period $N_{pd}$ for the TDD Scell may be set to one of CSI transmission periods $N_{pd}$ that can be applied to the FDD Pcell. That is, if CA has been configured between the TDD Scell and the FDD Pcell, one of {2, 5, 10, 20, 40, 80, 160, 32, 64, 128} that can be set for FDD cells of the typical LTE and LTE-A system may be selected as $N_{pd}$ of the TDD Scell, and the NB may transmit information about the selected $N_{pd}$ to the UE. The UE may perform "periodic CSI reporting" in UL subframes of the FDD Pcell satisfying Equation 1, based on the $N_{pd}$ indicated by the NB. Accordingly, in the CA, the UE may perform "periodic CSI reporting" for the TDD Scell at $N_{pd}=\{2, 32, 64, 128\}$ not defined for TDD cells of the typical LTE and LTE-A system, through the FDD Pcell.

Sixth Embodiment

In a CA system in which a cell (also, referred to as an FDD cell) using the FDD scheme and a cell (also, referred to as a TDD cell) using the TDD scheme are aggregated and operated, when the TDD cell is configured with a frequency f1 to operate as a Scell (hereinafter, the TDD cell is referred to as a TDD Scell), and the FDD cell is configured with an uplink frequency f2 and a downlink frequency f3 to operate as a Pcell (hereinafter, the FDD cell is referred to as an FDD Pcell), operation for performing "periodic CSI reporting" for the TDD Scell through the FDD Pcell will be described in detail, below.

According to the sixth embodiment, in the CA, a CSI transmission period $N_{pd}$ that can be applied to a TDD Scell may be set based on a separate group decided in consideration of possible CSI transmission periods of an FDD cell, instead of {1, 5, 10, 20, 40, 80, 160} decided for a TDD cell of a single carrier wave.

Method 1: CSI transmission period $N_{pd}$ that can be applied to a TDD Scell may be selected from among CSI transmission periods $N_{pd}$ that can be applied to an FDD Pcell. That is, a group of CSI transmission periods $N_{pd}$ that can be applied to a TDD Scell may be {2, 5, 10, 20, 40, 80, 160, 32, 64, 128}. A NB may select an element from the group to decide $N_{pd}$ for a TDD Scell configured for a UE, and transmit information about the selected $N_{pd}$ to the UE. The UE may perform "periodic CSI reporting" in UL subframes of the FDD Pcell satisfying Equation 1, based on the $N_{pd}$ indicated by the NB. Accordingly, in the CA, the UE may perform "periodic CSI reporting" for the TDD Scell at $N_{pd}$={2, 32, 64, 128} not defined for TDD cells of the typical LTE and LTE-A system, through the FDD Pcell.

Method 2: CSI transmission period $N_{pd}$ that can be applied to a TDD Scell may be selected from {5, 10, 20, 40, 80, 160} that can be applied in common to TDD cells and FDD cells. A NB may select an element from the group to decide $N_{pd}$ for a TDD Scell configured for a UE, and transmit information about the selected $N_{pd}$ to the UE. The UE may perform "periodic CSI reporting" in UL subframes of the FDD Pcell satisfying Equation 1, based on the NO indicated by the NB.

According to the sixth embodiment, the NB and UE may set a CSI transmission period $N_{pd}$ that is applied to the TDD Scell or the TDD cell, according to whether CA has been configured between the TDD cell and the FDD cell. That is, if CA has been configured between the TDD cell and the FDD cell, a CSI transmission period $N_{pd}$ that is applied to the TDD Scell may be set according to Method 1 or Method 2. If no CA has been configured between the TDD cell and the FDD cell, that is, if the TDD cell has been operated alone, or if CA has been configured between TDD cells, a CSI transmission period $N_{pd}$ that is applied to a TDD cell may be selected from among CSI transmission periods $N_{pd}$ defined for TDD cells of the typical LTE and LTE-A system.

Figure 13:
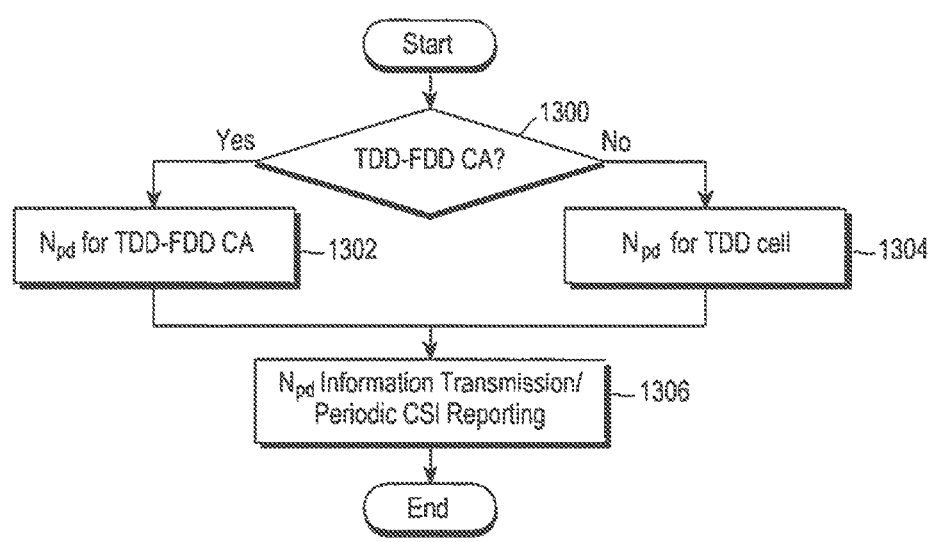
FIG. 13 is a flowchart illustrating a method of setting a CSI transmission period, according to another embodiment of the present disclosure.

FIG. 13 is a flowchart illustrating a method of setting a CSI transmission period, according to another embodiment of the present disclosure. The flowchart shown in FIG. 13 can be applied to both a NB and a UE.

First, operation of a NB will be described with reference to FIG. 13, below. In operation 1300, the NB may determine whether CA between a TDD cell and an FDD cell has been configured with respect to a UE. If the NB determines that CA between the TDD cell and the FDD cell has been configured, the NB may set a CSI transmission period $N_{pd}$ that is applied to a TDD Scell, based on {2, 5, 10, 20, 40, 80, 160, 32, 64, 128} according to Method 1 or {5, 10, 20, 40, 80, 160} according to Method 2, in operation 1302.

In contrast, if the NB determines that no CA has been configured between the TDD cell and the FDD cell, that is, if the TDD cell has been configured alone with respect to the UE, or if CA has been configured between TDD cells, the NB may set a CSI transmission period $N_{pd}$ that is applied to the TDD cell, based on a group of CSI transmission periods $N_{pd}$ defined for TDD cells of the typical LTE and LTE-A system, in operation 1304.

In operation 1306, the NB may transmit information about the Ni to the UE. Then, the UE may periodically report CSI for the TDD Scell in UL subframes of the FDD Pcell satisfying Equation 1, based on the received information about the $N_{pd}$.

According to another embodiment, if the UE is configured to select $N_{pd}$ through the same algorithm as that used in the NB, the NB may omit operation 1306 of transmitting information about $N_{pd}$, and the UE may itself decide $N_{pd}$ without receiving information about $N_{pd}$ from the NB, and periodically report CSI for the FDD Scell using the decided $N_{pd}$.

Now, operation of the UE will be described with reference to FIG. 13. In operation 1300, the UE may determine whether CA between the TDD cell and the FDD cell has been configured by the NB. If the UE determines that CA between the TDD cell and the FDD cell has been configured, the UE may set a CSI transmission period $N_{pd}$ that is applied to the TDD Scell, based on {2, 5, 10, 20, 40, 80, 160, 32, 64, 128} according to Method 1 or {5, 10, 20, 40, 80, 160} according to Method 2, in operation 1302.

In contrast, if the UE determines that no CA between the TDD cell and the FDD cell has been configured, that is, if the TDD cell has been configured alone with respect to the UE, or if CA has been configured between TDD cells, the UE may set a CSI transmission period $N_{pd}$ that is applied to the TDD Scell, based on a group of CSI transmission periods $N_{pd}$ defined for TDD cells of the typical LTE and LTE-A system, in operation 1304.

In operation 1306, the UE may perform "periodic CSI reporting" for the TDD Scell based on the set $N_{pd}$. According to another embodiment, the UE may receive information about $N_{pd}$ from the NB, instead of itself setting $N_{pd}$, and perform "periodic CSI reporting" for the TDD Scell, based on the received $N_{pd}$.

Figure 14:
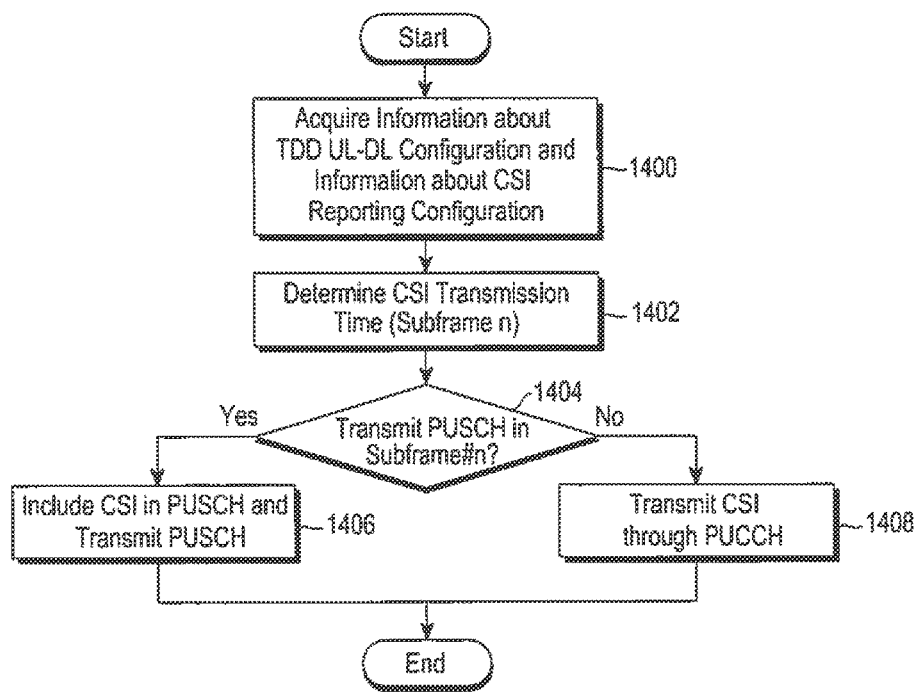
FIG. 14 is a flowchart illustrating a method in which a User Equipment (UE) reports CSI, according to an embodiment of the present disclosure.

FIG. 14 is a flowchart illustrating a method in which a UE performs "periodic CSI reporting", according to an embodiment of the present disclosure.

Referring to FIG. 14, in operation 1400, the UE may acquire information about a TDD uplink-downlink configuration and information about a CSI reporting configuration, from a NB. The information about the CSI reporting configuration may be at least one of a CSI transmission period $N_{pd}$ and a subframe offset $N_{OFFSET,CQI}$. In operation 1402, the UE may determine a CSI transmission time for "periodic CSI reporting". At this time, the UE may determine the CSI transmission time according to one of the above-described embodiments. If it is needed to perform "periodic CSI reporting" in Subframe#n, the UE may determine whether it is needed to perform PUSCH transmission in the Subframe#n, in operation 1404. If the UE determines that it is needed to perform PUSCH transmission in the Subframe#n, the UE may include CSI in PUSCH in the Subframe#n, and transmit the PUSCH to a NB, in operation 1406. If the UE determines that it is not needed to perform PUSCH transmission in the Subframe#n in operation 1404, the UE may transmit CSI through PUCCH in the Subframe#n, in operation 1408.

Figure 15:
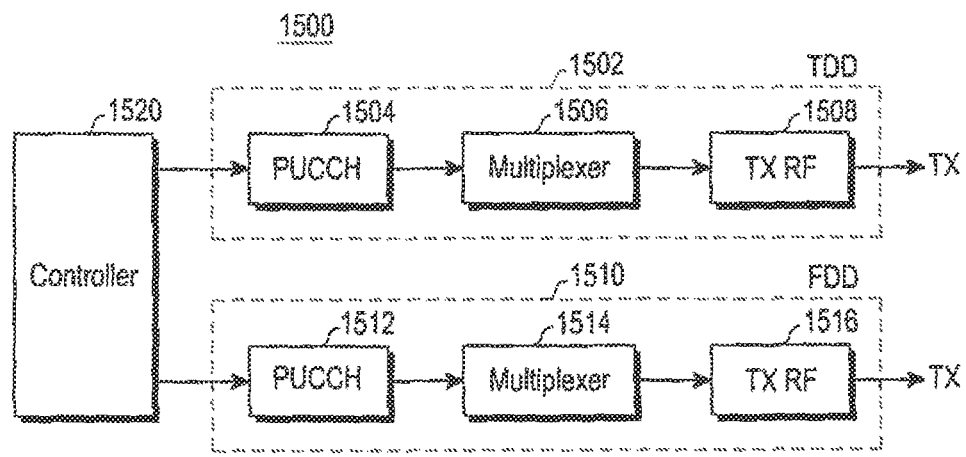
FIG. 15 shows a configuration of a UE transmission apparatus according to an embodiment of the present disclosure.

FIG. 15 shows a configuration of a UE transmission apparatus according to an embodiment of the present disclosure. For convenience of description, components not directly related to the present disclosure will be neither shown nor described.

Referring to FIG. 15, a UE 1500 may include a TDD cell transmitter 1502, an FDD cell transmitter 1510, and a controller 1520. The TDD cell transmitter 1502 may include a PUCCH block 1504, a multiplexer 1506, and a transmit Radio Frequency (RF) block 1508, and the FDD cell transmitter 1510 may include a PUCCH block 1512, a multiplexer 1514, and a transmit RF block 1516. The controller 1520 may control the individual blocks of the FDD cell transmitter 1510 and the TDD cell transmitter 1502 according to one of the above-described embodiments with respect to "periodic CSI reporting" of the UE 1500, with reference to control information received from a NB. The control information may include at least one of information about a TDD uplink-downlink configuration and information about a CSI reporting configuration, according to an embodiment.

The PUCCH block 1504 of the TDD cell transmitter 1502 may generate a PUCCH signal including CSI, if a TDD Pcell is configured with respect to the UE 1500 by the NB. If there is another uplink transmission signal that is transmitted to the TDD cell, the UE 1500 may multiplex the PUCCH signal with the other uplink transmission signal through the multiplexer 1506, perform signal processing on the multiplexed signal through the transmit RF block 1508, and then transmit the signal-processed signal to the NB.

The PUCCH block 1512 of the FDD cell transmitter 1510 may generate a PUCCH signal including CSI, if an FDD Pcell for the UE 1500 is configured by the NB. If there is another uplink transmission signal that is transmitted to the FDD cell, the UE 1500 may multiplex the PUCCH signal with the other uplink transmission signal through the multiplexer 1514, perform signal processing on the multiplexed signal through the transmit RF block 1516, and then transmit the signal-processed signal to the NB.

Figure 16:
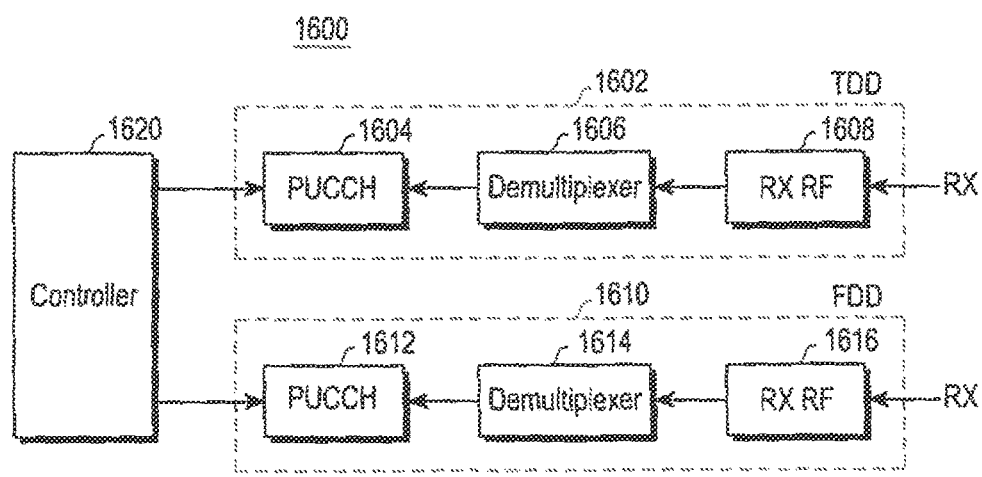
FIG. 16 shows a configuration of a Node B reception apparatus according to an embodiment of the present disclosure.

FIG. 16 shows a configuration of a NB reception apparatus according to an embodiment of the present disclosure. For convenience of description, components not directly related to the present disclosure will be neither shown nor described.

Referring to FIG. 16, a NB 1600 may include a TDD cell receiver 1602, an FDD cell receiver 1610, and a controller 1620. The TDD cell receiver 1602 may include a PUCCH block 1604, a demultiplexer 1606, and a receive RF block 1608, and the FDD cell receiver 1610 may include a PUCCH block 1612, a demultiplexer 1614, and a receive RF block 1616. The controller 1620 may control the individual blocks of the TDD cell receiver 1602 and the FDD cell receiver 1610 according to one of the above-described embodiments so that the NB 1600 can receive CSI transmitted from a UE. According to an embodiment, the controller 1620 may transmit one of information about a TDD uplink-downlink configuration and information about a CSI reporting configuration to a UE through a separate transmitter (not shown).

If a TDD Pcell for a UE is configured, the TDD cell receiver 1602 may perform signal processing on a signal received from the UE through the receive RF block 1616, extract a PUCCH signal from the signal through the demultiplexer 1606, and then acquire CSI from the PUCCH signal through the PUCCH block 1604.

If an FDD Pcell for a UE is configured, the FDD cell receiver 1610 may perform signal processing on a signal received from the UE through the receive RF block 1616, extract a PUCCH signal from the signal through the demultiplexer 1614, and then acquire CSI from the PUCCH signal through the PUCCH block 1612.

Seventh Embodiment

The seventh embodiment relates to a method of deciding a subframe offset $N_{OFFSET,CQI}$ for CSI reporting of a Scell when CA is configured between a TDD cell and an FDD cell. More specifically, the subframe offset $N_{OFFSET,CQI}$ for CSI reporting of the Scell may be decided using the method of deciding a CSI transmission period $N_{pd}$ for CSI reporting of a Scell, as described above in the first to sixth embodiments. In a LTE system, a NB may provide a UE with related information for periodic CSI reporting through cqi-pmi-ConfigIndex ($I_{CQI/PMI}$) as a parameter that is transmitted through upper-layer signaling, for example, Radio Resource Control (RRC) signaling. The related information for periodic CSI reporting may be a CSI transmission period $N_{pd}$ and a subframe offset $N_{OFFSET,CQI}$. cqi-pmi-ConfigIndex is a parameter that is used to decide how often a UE reports CQI and PMI of CSI through PUCCH.

Table 3 and Table 4 show mapping relationships of $I_{CQI/PMI}$ to $N_{pd}$ and $N_{OFFSET,CQI}$ defined for an FDD cell and a TDD cell of a LTE system. For example, in an FDD cell in which no CA has been configured, if a UE receives a signalling of $I_{CQI/PMI}=2$ from a NB, the UE may decide related information for periodic CSI reporting of the FDD cell, as $N_{pd}=5$ and $N_{OFFSET,CQI}=0$, according to Table 3. Likewise, the NB may decide related information for periodic CSI reporting of the FDD cell, according to Table 3, and then expect to receive CSI from the UE at a decided timing.

The following Table 3 shows mapping relationships of $I_{CQI/PMI}$ to $N_{pd}$ and $N_{OFFSET,CQI}$ for FDD.

TABLE 3

| $I_{CQI/PMI}$ | Value of $N_{pd}$ | Value of $N_{OFFSET, CQI}$ |
|---|---|---|
| $0 \leq I_{CQI/PMI} \leq 1$ | 2 | $I_{CQI/PMI}$ |
| $2 \leq I_{CQI/PMI} \leq 6$ | 5 | $I_{CQI/PMI} - 2$ |
| $7 \leq I_{CQI/PMI} \leq 16$ | 10 | $I_{CQI/PMI} - 7$ |
| $17 \leq I_{CQI/PMI} \leq 36$ | 20 | $I_{CQI/PMI} - 17$ |
| $37 \leq I_{CQI/PMI} \leq 76$ | 40 | $I_{CQI/PMI} - 37$ |
| $77 \leq I_{CQI/PMI} \leq 156$ | 80 | $I_{CQI/PMI} - 77$ |
| $157 \leq I_{CQI/PMI} \leq 316$ | 160 | $I_{CQI/PMI} - 157$ |
| $I_{CQI/PMI} = 317$ | | Reserved |
| $318 \leq I_{CQI/PMI} \leq 349$ | 32 | $I_{CQI/PMI} - 318$ |
| $350 \leq I_{CQI/PMI} \leq 413$ | 64 | $I_{CQI/PMI} - 350$ |
| $414 \leq I_{CQI/PMI} \leq 541$ | 128 | $I_{CQI/PMI} - 414$ |
| $542 \leq I_{CQI/PMI} \leq 1023$ | | Reserved |

The following Table 4 shows mapping relationships of $I_{CQI/PMI}$ to $N_{pd}$ and $N_{OFFSET,CQI}$ for TDD.

TABLE 4

| $I_{CQI/PMI}$ | Value of $N_{pd}$ | Value of $N_{OFFSET, CQI}$ |
|---|---|---|
| $I_{CQI/PMI} = 0$ | 1 | $I_{CQI/PMI}$ |
| $1 \leq I_{CQI/PMI} \leq 5$ | 5 | $I_{CQI/PMI} - 1$ |
| $6 \leq I_{CQI/PMI} \leq 15$ | 10 | $I_{CQI/PMI} - 6$ |
| $16 \leq I_{CQI/PMI} \leq 35$ | 20 | $I_{CQI/PMI} - 16$ |
| $36 \leq I_{CQI/PMI} \leq 75$ | 40 | $I_{CQI/PMI} - 36$ |
| $76 \leq I_{CQI/PMI} \leq 155$ | 80 | $I_{CQI/PMI} - 76$ |
| $156 \leq I_{CQI/PMI} \leq 315$ | 160 | $I_{CQI/PMI} - 156$ |
| $316 \leq I_{CQI/PMI} \leq 1023$ | | Reserved |

In a CA system in which a cell using the FDD scheme and a cell using the TDD scheme are aggregated to operate a TDD Pcell and an FDD Scell, a method of deciding $N_{pd}$ and $N_{OFFSET,CQI}$ to perform "periodic CSI reporting" for the FDD Scell through the TDD Pcell will be described in regard of the first to third embodiments, based on Table 3 and Table 4.

First Embodiment

UE may decide $N_{pd}$ and $N_{OFFSET,CQI}$ for "periodic CSI reporting" of the FDD Scell, according to Table 3. However, as defined in the first embodiment, $N_{pd}$ a that can be set for the FDD Scell may be limited according to a TDD uplink-downlink configuration of the TDD Pcell.

Second Embodiment

UE may decide $N_{pd}$ and $N_{OFFSET,CQI}$ for "periodic CSI reporting" of the FDD Scell, according to Table 3.

Method 1 of Third Embodiment

UE may decide $N_{pd}$ and $N_{OFFSET,CQI}$ for "periodic CSI reporting" of the FDD Scell, according to Table 4.

Method 2 of Third Embodiment

UE may decide $N_{pd}$ and $N_{OFFSET,CQI}$ for "periodic CSI reporting" of the FDD Scell, according to one of Table 5, Table 6, and Table 7. Table which is to be used among Table 5, Table 6, and Table 7 may be defined in a specification, or may be appointed through signaling between the UE and NB. Table 5 is Table resulting from removing an item of $N_{pd}=1$ from Table 4. Table 6 is Table resulting from removing items of $N_{pd}=2, 32, 64, 128$ from Table 3. Table 7 is Table reconfigured with $N_{pd}=5, 10, 20, 40, 80, 160$ and $N_{OFFSET,CQI}$ corresponding to the $N_{pd}$ values.

TABLE 5

| $I_{CQI/PMI}$ | Value of $N_{pd}$ | Value of $N_{OFFSET, CQI}$ |
|---|---|---|
| $1 \le I_{CQI/PMI} \le 5$ | 5 | $I_{CQI/PMI} - 1$ |
| $6 \le I_{CQI/PMI} \le 15$ | 10 | $I_{CQI/PMI} - 6$ |
| $16 \le I_{CQI/PMI} \le 35$ | 20 | $I_{CQI/PMI} - 16$ |
| $36 \le I_{CQI/PMI} \le 75$ | 40 | $I_{CQI/PMI} - 36$ |
| $76 \le I_{CQI/PMI} \le 155$ | 80 | $I_{CQI/PMI} - 76$ |
| $156 \le I_{CQI/PMI} \le 315$ | 160 | $I_{CQI/PMI} - 156$ |
| $316 \le I_{CQI/PMI} \le 1023$ | | Reserved |

TABLE 6

| $I_{CQI/PMI}$ | Value of $N_{pd}$ | Value of $N_{OFFSET, CQI}$ |
|---|---|---|
| $2 \le I_{CQI/PMI} \le 6$ | 5 | $I_{CQI/PMI} - 2$ |
| $7 \le I_{CQI/PMI} \le 16$ | 10 | $I_{CQI/PMI} - 7$ |
| $17 \le I_{CQI/PMI} \le 36$ | 20 | $I_{CQI/PMI} - 17$ |
| $37 \le I_{CQI/PMI} \le 76$ | 40 | $I_{CQI/PMI} - 37$ |
| $77 \le I_{CQI/PMI} \le 156$ | 80 | $I_{CQI/PMI} - 77$ |
| $157 \le I_{CQI/PMI} \le 316$ | 160 | $I_{CQI/PMI} - 157$ |

TABLE 7

| $I_{CQI/PMI}$ | Value of $N_{pd}$ | Value of $N_{OFFSET, CQI}$ |
|---|---|---|
| $0 \le I_{CQI/PMI} \le 4$ | 5 | $I_{CQI/PMI}$ |
| $5 \le I_{CQI/PMI} \le 14$ | 10 | $I_{CQI/PMI} - 5$ |
| $15 \le I_{CQI/PMI} \le 34$ | 20 | $I_{CQI/PMI} - 15$ |
| $35 \le I_{CQI/PMI} \le 74$ | 40 | $I_{CQI/PMI} - 35$ |
| $75 \le I_{CQI/PMI} \le 154$ | 80 | $I_{CQI/PMI} - 75$ |
| $155 \le I_{CQI/PMI} \le 314$ | 160 | $I_{CQI/PMI} - 155$ |

Now, in a CA system in which a cell using the FDD scheme and a cell using the TDD scheme are aggregated to operate a TDD Pcell and an FDD Scell, a method of deciding $N_{pd}$ and $N_{OFFSET,CQI}$ to perform "periodic CSI reporting" for the TDD Scell through the FDD Pcell will be described in regard of the fourth to sixth embodiments, based on Table 3 and Table 4.

Fourth Embodiment

UE may decide $N_{pd}$ and $N_{OFFSET,CQI}$ for "periodic CSI reporting" of the TDD scell, according to Table 4.

Fifth Embodiment

UE may decide $N_{pd}$ and $N_{OFFSET,CQI}$ for "periodic CSI reporting" of the TDD scell, according to Table 3.

Method 1 of Sixth Embodiment

UE may decide $N_{pd}$ and $N_{OFFSET,CQI}$ for "periodic CSI reporting" of the TDD scell, according to Table 3.

Method 2 of Seventh Embodiment

UE may decide $N_{pd}$ and $N_{OFFSET,CQI}$ for "periodic CSI reporting" of the TDD scell, according to one of Table 5, Table 6, and Table 7. Table which is to be used among Table 5, Table 6, and Table 7 may be defined in a communication standard specification, or may be appointed through signaling between the UE and the NB.

If the UE receives a value that is different from Ni defined in the first to seventh embodiments, as a CSI transmission period of the Scell, from the NB, the UE cannot perform "periodic CSI reporting" of the Scell.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

The invention claimed is:

1. A method of receiving channel status information (CSI) in a cellular radio communication system, the method comprising:

configuring carrier aggregation (CA) with a first serving cell supporting a frequency division duplex (FDD) mode and a second serving cell supporting a time division duplex (TDD) mode with respect to a user equipment (UE);

transmitting, to the UE, a first parameter for periodic CSI reporting of the first serving cell and a second parameter for periodic CSI reporting of the second serving cell;

in a case of the first serving cell being a primary cell, acquiring a first CSI transmission period and a first offset for the first serving cell based on the first parameter from a first table related to the FDD mode, and a second CSI transmission period and a second offset for the second serving cell based on the second parameter from the first table;

in a case of the second serving cell being a primary cell, acquiring a third CSI transmission period and a third offset for the first serving cell based on the first parameter from a second table related to the TDD mode, and a fourth CSI transmission period and a fourth offset for the second serving cell based on the second parameter from the second table;

receiving, from the UE, a periodic CSI report of the first serving cell in a first subframe determined according to the first CSI transmission period and the first offset or according to the third CSI transmission period and the third offset;

receiving, from the UE, a periodic CSI report of the second serving cell in a second subframe determined according to the second CSI transmission period and the second offset or according to the fourth CSI transmission period and fourth offset, wherein the periodic CSI report of the first or second serving cell is received on a physical uplink shared channel (PUSCH) in the first or second subframe, respectively, in a case that the UE has a PUSCH transmission in the first or second subframe, wherein the first table is configured for the primary cell of the FDD mode in FDD-TDD CA and comprises a plurality of CSI transmission periods and a plurality of offsets, the plurality of CSI transmission periods in the first table comprises {2, 5, 10, 20, 40, 80, 160, 32, 64, 128}, and wherein the second table is configured for the primary cell of the TDD mode in FDD-TDD CA and comprises a plurality of CSI transmission periods and a plurality of offsets, the plurality of CSI transmission periods in the second table comprises {1, 5, 10, 20, 40, 80, 160}.

2. The method of claim 1, further comprising:
receiving, from the UE, the periodic CSI report of the first or second cell on a physical uplink control channel (PUCCH), in a case that the UE does not have a PUSCH transmission in the first or second subframe.

3. A method in which a user equipment (UE) reports Channel State Information (CSI) in a cellular radio communication system, comprising:
receiving, from a base station, configuration information for configuring carrier aggregation (CA) with a first serving cell supporting a frequency division duplex (FDD) mode and a second serving cell supporting a time division duplex (TDD) mode;
receiving, from the base station, a first parameter for periodic CSI reporting of the first serving cell and a second parameter for periodic CSI reporting of the second serving cell;
in a case of the first serving cell being a primary cell, acquiring a first CSI transmission period and a first offset for the first serving cell based on the first parameter from a first table related to the FDD mode, and a second CSI transmission period and a second offset for the second serving cell based on the second parameter from the first table;
in a case of the second serving cell being a primary cell, acquiring a third CSI transmission period and a third offset for the first serving cell based on the first parameter from a second table related to the TDD mode and a fourth CSI transmission period and a fourth offset for the second serving cell based on the second parameter from the second table;
transmitting, to the base station, a periodic CSI report of the first serving cell in a first subframe determined according to the first CSI transmission period and the first offset, or according to the third CSI transmission period and the third offset; and
transmitting, to the base station, a periodic CSI report of the second serving cell in a second subframe determined according to the second CSI transmission period and the second offset, or according to the fourth CSI transmission period and the fourth offset,
wherein the periodic CSI report of the first or second serving cell is transmitted on a physical uplink shared channel (PUSCH) in the first or second subframe, respectively, in a case that the UE has a PUSCH transmission in the first or second subframe,
wherein the first table is configured for the primary cell of the FDD mode in FDD-TDD CA and comprises a plurality of CSI transmission periods and a plurality of offsets, the plurality of CSI transmission periods in the first table comprises {2, 5, 10, 20, 40, 80, 160, 32, 64, 128}, and
wherein the second table is configured for the primary cell of the TDD mode in FDD-TDD CA and comprises a plurality of CSI transmission periods and a plurality of offsets, the plurality of CSI transmission periods in the second table comprises {1, 5, 10, 20, 40, 80, 160}.

4. The method of claim 3, further comprising:
transmitting the periodic CSI report of the first or second serving cell on a physical uplink control channel (PUCCH), in a case that the UE does not have a PUSCH transmission in the first or second subframe.

5. A base station of controlling channel status information (CSI) reporting in a cellular radio communication system, comprising:
a controller adapted to configure carrier aggregation (CA) with a first serving cell supporting a frequency division duplex (FDD) mode and a second serving cell supporting a time division duplex (TDD) mode with respect to a user equipment (UE); and
a transceiver adapted to transmit, to the UE, a first parameter for periodic CSI reporting of the first serving cell and a second parameter for periodic CSI reporting of the second serving cell,
wherein, in a case of the first serving cell being a primary cell, the controller acquires a first CSI transmission period and a first offset for the first serving cell based on the first parameter from a first table related to the FDD mode, and a second CSI transmission period and a second offset for the second serving cell based on the second parameter from the first table,
wherein, in a case of the second serving cell being a primary cell, the controller acquires a third CSI transmission period and a third offset for the first serving cell based on the first parameter from a second table related to the TDD mode, and a fourth CSI transmission period and a fourth offset for the second serving cell based on the second parameter from the second table,
wherein the transceiver is adapted to receive, from the UE, a periodic CSI report of the first serving cell in a first subframe determined according to the first CSI transmission period and the first offset, or according to the third CSI transmission period and the third offset,
wherein the transceiver is adapted to receive, from the UE, a periodic CSI report of the second serving cell in a second subframe determined according to the second CSI transmission period and the second offset, or according to the fourth CSI transmission period and the fourth offset,
wherein the periodic CSI report of the first or second serving cell is received on a physical uplink shared channel (PUSCH) in the first or second subframe, respectively, in a case that the UE has a PUSCH transmission in the first or second subframe,
wherein the first table is configured for the primary cell of the FDD mode in FDD-TDD CA and comprises a plurality of CSI transmission periods and a plurality of offsets, the plurality of CSI transmission periods in the first table comprises {2, 5, 10, 20, 40, 80, 160, 32, 64, 128}, and
wherein the second table is configured for the primary cell of the TDD mode in FDD-TDD CA and comprises a plurality of CSI transmission periods and a plurality of offsets, the plurality of CSI transmission periods in the second table comprises {1, 5, 10, 20, 40, 80, 160}.

6. A user equipment (UE) of reporting channel status information (CSI) in a cellular radio communication system, comprising:
a transceiver adapted to receive, from a base station, configuration information for configuring carrier aggregation (CA) with a first serving cell supporting a frequency division duplex (FDD) mode and a second serving cell supporting a time division duplex (TDD) mode, and to receive a first parameter for periodic CSI reporting of the first serving cell and a second parameter for periodic CSI reporting of the second serving cell; and
a controller adapted to, in a case of the first serving cell being a primary cell, acquire a first CSI transmission period and a first offset for the first serving cell based on the first parameter from a first table related to the FDD mode and a second CSI transmission period and a second offset for the second serving cell based on the second parameter from the first table, and in a case of the second serving cell being a primary cell, acquire a third CSI transmission period and a third offset for the first serving cell based on the first parameter from a second table related to the TDD mode and a fourth CSI transmission period and a fourth offset for the second serving cell based on the second parameter from the second table, wherein the transceiver is further adapted to transmit, to the base station, a periodic CSI report of the first serving cell in a first subframe determined according to the first CSI transmission period and the first offset or according to the third CSI transmission period and the third offset, and transmit, to the base station, a periodic CSI report of the second serving cell in a second subframe determined according to the second CSI transmission period and the second offset or according to the fourth CSI transmission period and the fourth offset, wherein the periodic CSI report of the first or second serving cell is transmitted on a physical uplink shared channel (PUSCH) in the first or second subframe, respectively, in a case that the UE has a PUSCH transmission in the first or second subframe, wherein the first table is configured for the primary cell of the FDD mode in FDD-TDD CA and comprises a plurality of CSI transmission periods and a plurality of offsets, the plurality of CSI transmission periods in the first table comprises {2, 5, 10, 20, 40, 80, 160, 32, 64, 128}, and wherein the second table is configured for the primary cell of the TDD mode in FDD-TDD CA and comprises a plurality of CSI transmission periods and a plurality of offsets, the plurality of CSI transmission periods in the second table comprises {1, 5, 10, 20, 40, 80, 160}.

* * * * *